US010210104B2

(12) United States Patent
Lim et al.

(10) Patent No.: US 10,210,104 B2
(45) Date of Patent: Feb. 19, 2019

(54) APPARATUS AND METHOD FOR PROVIDING HANDOFF THEREOF

(71) Applicant: Samsung Electronics Co., Ltd., Suwon-si, Gyeonggi-do (KR)

(72) Inventors: Kyung Soo Lim, Yongin-si (KR); Jae Bong Yoo, Seongnam-si (KR); Jun Hak Lim, Suwon-si (KR); Duk Ki Hong, Seoul (KR); Gi Beom Kim, Seongnam-si (KR); Seung Hwan Cho, Yonginsi (KR); Hyuk Kang, Yongin-si (KR); Tae Gun Park, Hwaseong-si (KR); In Ji Jin, Bucheon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 8 days.

(21) Appl. No.: 15/352,213

(22) Filed: Nov. 15, 2016

(65) Prior Publication Data
US 2017/0139847 A1 May 18, 2017

(30) Foreign Application Priority Data
Nov. 17, 2015 (KR) .................. 10-2015-0161007

(51) Int. Cl.
*G06F 9/48* (2006.01)
*H04W 4/80* (2018.01)
(Continued)

(52) U.S. Cl.
CPC .......... *G06F 13/102* (2013.01); *G06F 9/4856* (2013.01); *G06F 13/128* (2013.01); *H04L 67/148* (2013.01); *H04W 4/80* (2018.02)

(58) Field of Classification Search
CPC .... G06F 9/4405; G06F 9/4416; G06F 9/4418; G06F 9/44505; G06F 9/461;
(Continued)

(56) References Cited

U.S. PATENT DOCUMENTS 6,549,968 B1 * 4/2003 Hart .................. G06F 1/1632
710/303
7,386,855 B2 * 6/2008 Song .................. H04L 29/06
719/310

(Continued)

FOREIGN PATENT DOCUMENTS

KR 10-2011-0015055 A 2/2011
KR 10-2015-0055851 A 5/2015
(Continued)

OTHER PUBLICATIONS

Extended European Search Report dated Sep. 4, 2018, issued in the European patent application No. 16866617.0.

*Primary Examiner* — Thomas J Cleary
(74) *Attorney, Agent, or Firm* — Jefferson IP Law, LLP

(57) ABSTRACT

An electronic device is provided. The electronic device includes a transceiver that communicates with an external electronic device and at least one processor electrically connected with the transceiver. The processor is configured to obtain context information about an operation being performed at the electronic device, to generate identification information about a recommended operation associated with the operation being performed, based on the context information about the operation being performed and to send the identification information about the recommended operation to the external electronic device by using the transceiver.

20 Claims, 13 Drawing Sheets

(51) Int. Cl.
  *G06F 13/10* (2006.01)
  *G06F 13/12* (2006.01)
  *H04L 29/08* (2006.01)

(58) Field of Classification Search
  CPC .... G06F 9/4806; G06F 13/102; G06F 13/128; G06F 15/7871; H04L 67/10; H04L 67/1095; H04L 67/18; H04L 67/34
  See application file for complete search history.

(56) References Cited

U.S. PATENT DOCUMENTS

| | | | |
|---|---|---|---|
| 8,155,588 | B2 | 4/2012 | Dubs et al. |
| 8,224,894 | B1 | 7/2012 | Parks et al. |
| 8,386,563 | B2 | 2/2013 | Parks et al. |
| 8,401,681 | B2 | 3/2013 | Rosenblatt et al. |
| 8,458,363 | B2 | 6/2013 | Rosenblatt et al. |
| 9,130,802 | B2 | 9/2015 | Rosenblatt et al. |
| 9,237,189 | B2 | 1/2016 | Parks et al. |
| 2004/0199697 | A1* | 10/2004 | Meynard .............. G06F 9/4418 710/303 |
| 2005/0038960 | A1* | 2/2005 | Himmel .............. G06F 9/4406 711/115 |
| 2009/0113018 | A1* | 4/2009 | Thomson .............. H04W 8/12 709/208 |
| 2009/0170521 | A1 | 7/2009 | Dubs et al. |
| 2009/0276547 | A1 | 11/2009 | Rosenblatt et al. |
| 2010/0082136 | A1 | 4/2010 | Rosenblatt et al. |
| 2012/0290669 | A1 | 11/2012 | Parks et al. |
| 2013/0042042 | A1* | 2/2013 | Byrne .............. G06F 9/445 710/304 |
| 2013/0132896 | A1* | 5/2013 | Lee .............. G06Q 10/10 715/808 |
| 2013/0173699 | A1 | 7/2013 | Parks et al. |
| 2013/0311602 | A1 | 11/2013 | Rosenblatt et al. |
| 2013/0332560 | A1 | 12/2013 | Knight et al. |
| 2014/0059231 | A1 | 2/2014 | Choi et al. |
| 2014/0280580 | A1 | 9/2014 | Langlois et al. |
| 2015/0099505 | A1 | 4/2015 | Kiukkonen |
| 2015/0134743 | A1 | 5/2015 | Heo et al. |
| 2015/0350355 | A1 | 12/2015 | Linn et al. |
| 2017/0003931 | A1 | 1/2017 | Dvortsov et al. |

FOREIGN PATENT DOCUMENTS

| | | |
|---|---|---|
| WO | 2005/109829 A1 | 11/2005 |
| WO | 2015/112137 A1 | 7/2015 |

* cited by examiner

APPARATUS AND METHOD FOR PROVIDING HANDOFF THEREOF

CROSS-REFERENCE TO RELATED APPLICATION(S)

This application claims the benefit under 35 U.S.C. § 119(a) of a Korean patent application filed on Nov. 17, 2015 in the Korean Intellectual Property Office and assigned Serial number 10-2015-0161007, the entire disclosure of which is hereby incorporated by reference.

TECHNICAL FIELD

The present disclosure relates to a technology for providing a handoff function at an electronic device.

BACKGROUND

With the development of electronic technologies, various types of electronic devices are being developed and supplied. In particular, as an interest in electronic devices such as a tablet personal computer (PC), a wearable device, and the like as well as a smartphone recently increased, one user frequently makes use of various electronic devices at the same time. Accordingly, an interest in the handoff function to connect a plurality of electronic devices, which are successively used by the same user, with each other by sharing data between the plurality of electronic devices has increased.

In a handoff function between the plurality of electronic devices, the handoff function may be provided to only some applications therein. In addition, the handoff function may not be provided to a task that is being performed in the background in the electronic device.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method for providing a wide variety of handoff functions on a task, which is being performed, and an electronic device performing the same and providing a handoff function on another task associated with the task, which is being performed.

In accordance with an aspect of the present disclosure, an electronic device is provided. The electronic device includes a communication circuit, a memory that stores a plurality of applications including a first application and a second application, and at least one processor. The at least one processor is configured to execute the first application, select the second application of the plurality of applications based at least on the execution of the first application, and send first information corresponding to the first application and second information corresponding to the second application to an external electronic device of the electronic device by using the communication circuit.

In accordance with another aspect of the present disclosure, an electronic device is provided. The electronic device includes a communication circuit configured to communicate with an external electronic device and at least one processor electrically connected with the communication circuit. The at least one processor is configured to obtain context information about an operation being performed at the electronic device, generate identification information about a recommended operation associated with the operation being performed, based on the context information about the operation being performed, and send the identification information about the recommended operation to the external electronic device by using the communication circuit.

In accordance with another aspect of the present disclosure, a method is provided. The method includes executing the first application, verifying the second application selected from among the plurality of applications based at least on the execution of the first application, and sending first information corresponding to the first application and second information corresponding to the second application to an external electronic device of the electronic device by using the communication circuit.

In accordance with another aspect of the present disclosure, a method is provided. The method includes obtaining context information about an operation being performed at the electronic device, generating identification information about a recommended operation associated with the operation being performed, based on the context information about the operation being performed, and sending the identification information about the recommended operation to the external electronic device by using the communication circuit.

In accordance with another aspect of the present disclosure, a non-transitory computer-readable medium is provided. The medium is configured to store one or more computer programs including instruction that, when executed by at least one processor of an electronic device, cause the at least one processor to execute the first application, verify the second application selected from among the plurality of applications based at least on the execution of the first application, and send first information corresponding to the first application and second information corresponding to the second application to an external electronic device of the electronic device by using the communication circuit.

In accordance with another aspect of the present disclosure, a non-transitory computer-readable medium is provided. The medium is configured to store one or more computer programs including instruction that, when executed by at least one processor of an electronic device, cause the at least one processor to control for obtaining context information about an operation being performed at the electronic device, generating identification information about a recommended operation associated with the operation being performed, based on the context information about the operation being performed, and sending the identification information about the recommended operation to an external electronic device.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
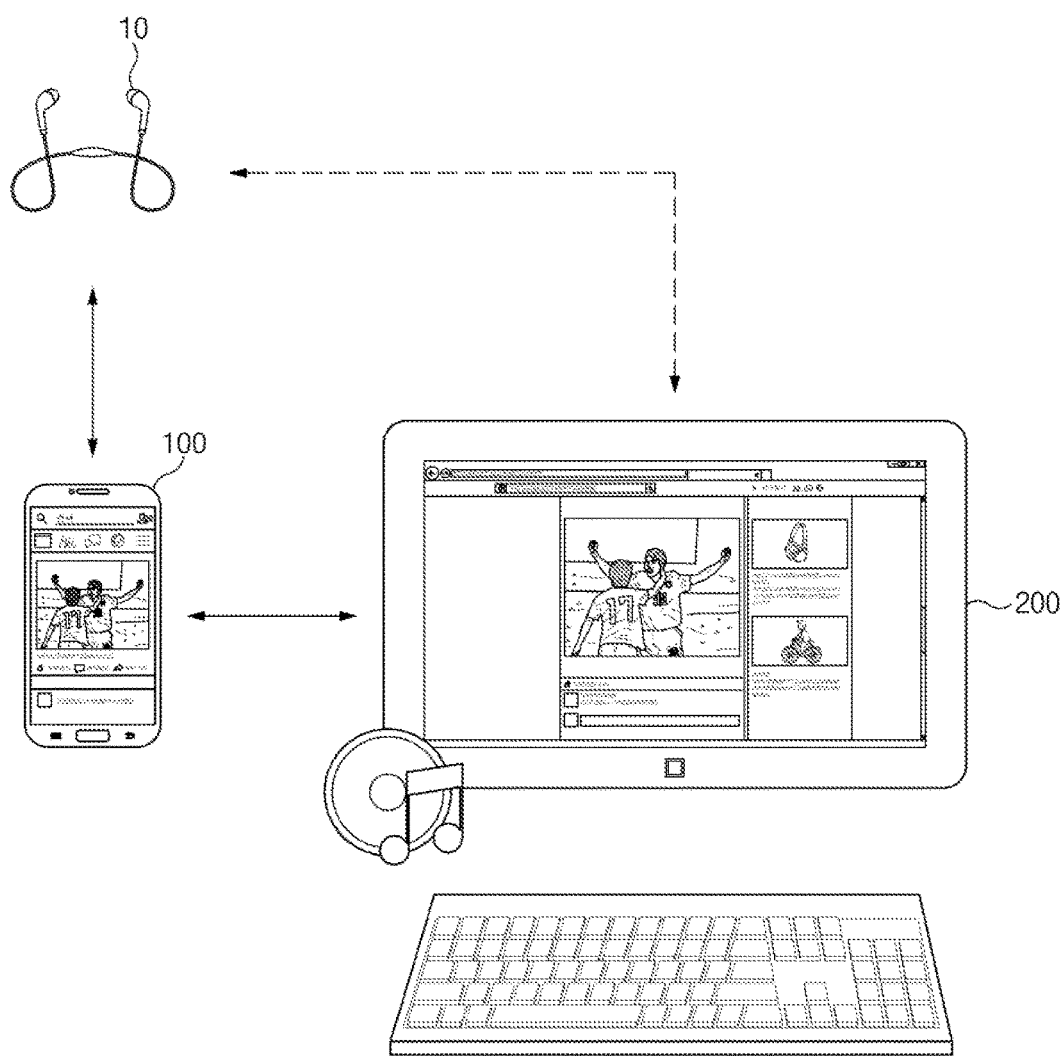
FIG. 1 illustrates an operating environment of an electronic device according to an embodiment of the present disclosure.

The following description with reference to accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the disclosure disclosed herein, the expressions "have", "may have", "include" and "comprise", or "may include" and "may comprise" used herein indicate existence of corresponding features (e.g., elements such as numeric values, functions, operations, or components) but do not exclude presence of additional features.

In the disclosure disclosed herein, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used herein may refer to various elements of various embodiments of the present disclosure, but do not limit the elements. For example, "a first user device" and "a second user device" indicate different user devices regardless of the order or priority. For example, "a first user device" and "a second user device" indicate different user devices. For example, without departing the scope of the present disclosure, a first element may be referred to as a second element, and similarly, a second element may be referred to as a first element.

It will be understood that when an element (e.g., a first element) is referred to as being "(operatively or communicatively) coupled with/to" or "connected to" another element (e.g., a second element), it may be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element).

According to the situation, the expression "configured to" used herein may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other components. Central processing unit (CPU), for example, a "processor configured to perform A, B, and C" may mean a dedicated processor (e.g., an embedded processor) for performing a corresponding operation or a generic-purpose processor (e.g., a CPU or an application processor (AP)) which may perform corresponding operations by executing one or more software programs which are stored in a memory device.

All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the present disclosure. In some cases, even if terms are terms which are defined in the specification, they may not be interpreted to exclude embodiments of the present disclosure.

An electronic device according to various embodiments of the present disclosure may include at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) audio layer 3 (MP3) players, mobile medical devices, cameras, or wearable devices. According to various embodiments, a wearable device may include at least one of an accessory type of a device (e.g., a timepiece, a ring, a bracelet, an anklet, a necklace, glasses, a contact lens, or a head-mounted-device (HMD)), one-piece fabric or clothes type of a device (e.g., electronic clothes), a body-attached type of a device (e.g., a skin pad or a tattoo), or a bio-implantable type of a device (e.g., implantable circuit).

According to another embodiment, the electronic devices may be home appliances. The home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ or PlayStation™), electronic dictionaries, electronic keys, camcorders, electronic picture frames, or the like.

According to various embodiments, the electronic devices may include at least one of medical devices (e.g., various portable medical measurement devices (e.g., a blood glucose monitoring device, a heartbeat measuring device, a blood pressure measuring device, a body temperature measuring device, and the like)), a magnetic resonance angiography (MRA), a magnetic resonance imaging (MRI), a computed tomography (CT), scanners, and ultrasonic devices), navigation devices, global navigation satellite system (GNSS) receivers, event data recorders (EDRs), flight data recorders (FDRs), vehicle infotainment devices, electronic equipment for vessels (e.g., navigation systems and gyrocompasses), avionics, security devices, head units for vehicles, industrial or home robots, automatic teller's machines (ATMs), points of sales (POSs), or internet of things (e.g., light bulbs, various sensors, electric or gas meters, sprinkler devices, fire alarms, thermostats, street lamps, toasters, exercise equipment, hot water tanks, heaters, boilers, and the like).

According to another embodiment, the electronic devices may include at least one of parts of furniture or buildings/structures, electronic boards, electronic signature receiving devices, projectors, or various measuring instruments (e.g., water meters, electricity meters, gas meters, or wave meters, and the like). According to various embodiments, the electronic device may be one of the above-described devices or a combination thereof. An electronic device according to an embodiment may be a flexible electronic device. Furthermore, an electronic device according to an embodiment may not be limited to the above-described electronic devices and may include other electronic devices and new electronic devices according to the development of technologies.

Hereinafter, electronic devices according to various embodiments of the present disclosure will be described with reference to the accompanying drawings. The term "user" used herein may refer to a person who uses an electronic device or may refer to a device (e.g., an artificial intelligence electronic device) that uses an electronic device.

FIG. 1 illustrates an operating environment of an electronic device according to an embodiment of the present disclosure.

Referring to FIG. 1, the electronic device 100 may be operatively connected with an accessory 10 and an external electronic device 200.

The electronic device 100 may execute an application. For example, the electronic device 100 may execute a part of applications installed in the electronic device 100. As another example, the electronic device 100 may be connected to a web site by using a web browser installed in the electronic device 100. The electronic device 100 may provide information about the application to the external electronic device 200 such that the application executed by the electronic device 100 is executed at the external electronic device 200 connected with the electronic device 100. The electronic device 100 may provide the external electronic device 200 with information about an application associated with the executed application as well as information about the executed application. For example, in the case where the number of times that a music playback application is executed together with a web browser is high, the electronic device 100 may provide the external electronic device 200 with information about the music playback application together with information about the web browser. Furthermore, in the case where the number of times that the accessory 10 (e.g., an earphone) is connected with the electronic device 100 when the web browser is executed is high, the electronic device 100 may provide the external electronic device 200 with information about the accessory 10 together with the information about the web browser.

The external electronic device 200 may obtain the information about the application, which is executed at the electronic device 100, from the electronic device 100. For example, the external electronic device 200 may obtain the information about the web browser from the electronic device 100. The external electronic device 200 may execute the web browser based on the received information and may connect to the web page that is connected at the electronic device 100. The external electronic device 200 may output the same part as a part of the web page output to the electronic device 100, by scrolling the web page. The external electronic device 200 may obtain the information about an application associated with the application executed at the electronic device 100. For example, the external electronic device 200 may obtain the information about the music playback application together with the information about the web browser (even though the music application is not executed at the electronic device 100). The external electronic device 200 may execute the music playback application based on the received information. Furthermore, the external electronic device 200 may obtain the information about the accessory 10 together with the information about the web browser (even though the electronic device 100 is not connected with the accessory 10). The external electronic device 200 may be connected with the accessory 10 based on the information about the accessory 10.

Figure 2:
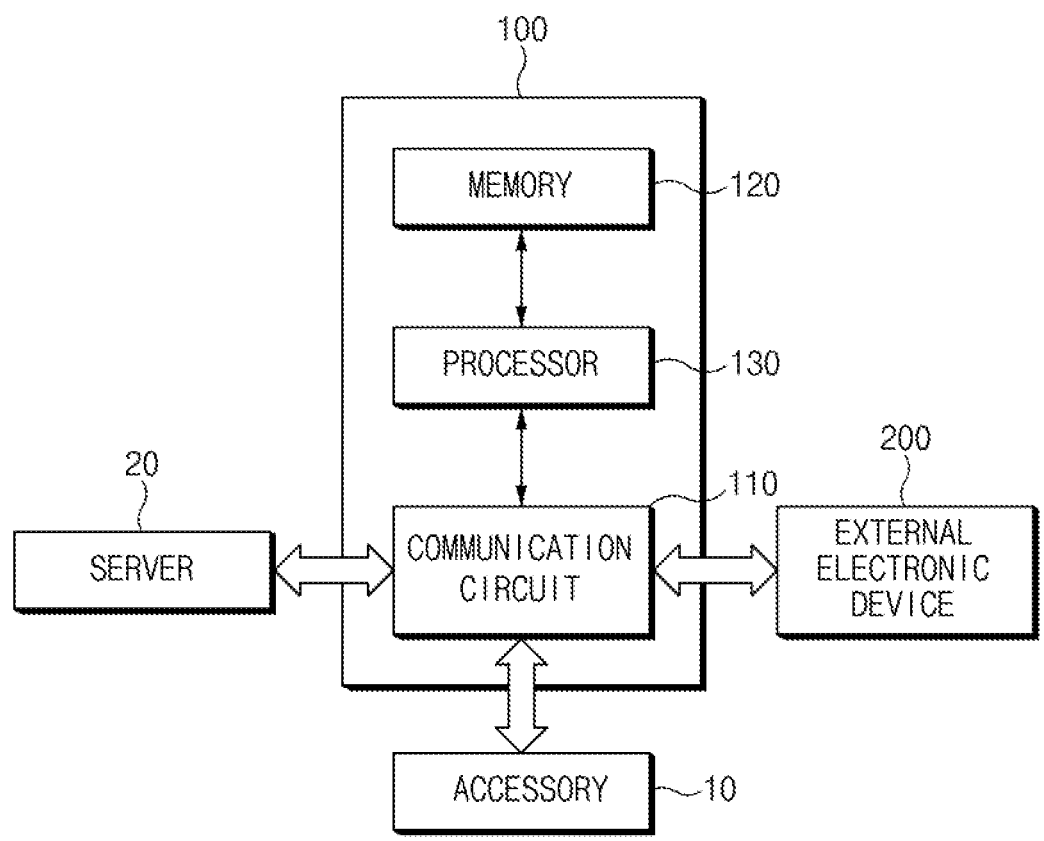
FIG. 2 is a block diagram illustrating a configuration of an electronic device according to an embodiment of the present disclosure.

FIG. 2 is a block diagram illustrating a configuration of an electronic device according to an embodiment of the present disclosure.

Referring to FIG. 2, the electronic device 100 may include, for example, a communication circuit 110, a memory 120, and a processor 130. The electronic device 100 may communicate with the external electronic device 200, the accessory 10, and a server 20 through the communication circuit 110.

The communication circuit 110 may communicate with the external electronic device 200 by using various wireless communication schemes. For example, the communication circuit 110 may communicate with the external electronic device 200 by using a local-area communication scheme (e.g., Bluetooth low energy (BLE), Wi-Fi direct, near field communication (NFC), or the like). The communication circuit 110 may send information about an operation for a handoff to the external electronic device 200. According to an embodiment, the communication circuit 110 may communicate with the accessory 10. The communication circuit 110 may obtain an input through, for example, the accessory 10 and may output content through the accessory 10. According to an embodiment, the communication circuit 110 may communicate with the server 20. The communication circuit 110 may receive context information about an operation (hereinafter referred to as a "current operation"), which is being performed, or an application, which is being executed, from, for example, the server 20. The communication circuit 110 may include, for example, at least one or more of a cellular module 1221, a Wi-Fi module 1222, a Bluetooth module 1223, or a NFC module 1225 of FIG. 12.

The memory 120 may include a volatile and/or a non-volatile memory. According to an embodiment, the memory 120 may store a plurality of applications including a first application and a second application.

The processor 130 may be electrically connected with the communication circuit 110 and the memory 120. The processor 130 may control the communication circuit 110 and the memory 120.

According to an embodiment, the processor 130 may perform various operations. For example, the processor 130 may execute one or more applications (e.g., the first application) of the plurality of applications stored in the memory 120. As another example, the processor 130 may be operatively connected with the accessory 10. Furthermore, although the processor 130 is illustrated as one element, the processor 130 may include one or more processors without departing form the teachings of the disclosure.

According to an embodiment, the processor 130 may obtain the context information about the current operation indicating a type of the current operation (or the first application). The processor 130 may obtain the context information by analyzing the information about the current operation. The processor 130 may obtain at least a portion of the context information about the current operation from the server 20 by using the communication circuit 110. For example, the processor 130 may obtain the context information including information about at least one of a type of an application associated with the current operation, a type of a web site associated with the operation being performed, an accessory, a place, or a time.

According to an embodiment, the processor 130 may generate identification information about a recommended operation, which makes it possible to identify the recommended operation associated with the current operation, based on the context information about the current operation. For example, the processor 130 may select an operation having a high probability that the selected operation is performed together with the current operation, as the recommended operation. Alternatively, the processor 130 may select an operation including context information, which has high similarity with the context information about the current operation, as the recommended operation. The processor 130 may generate the identification information about the recommended operation such that the external electronic device 200 identifies the recommended operation and executes the recommended operation based on the identification result. The recommended operation may include, for example, at least a portion of the current operation. In addition, the recommended operation may further include, for example, the current operation and another operation associated with the current operation. Also, the recommended operation may include, for example, an operation that is being performed in the background in the electronic device. The identification information may include, for example, an indication, which makes it possible to identify the recommended operation, and may include information about an icon of the recommended operation.

As another example, the processor 130 may select the second application of a plurality of applications based on execution of the first application. In the case where the processor 130 verifies the context information associated with the execution of the first application and the context information satisfies a specified condition, the processor 130 may select the second application. The context information associated with the execution of the first application may include, for example, a category of the first application, a time, or a place in which the first application is executed, or information of another external electronic device (e.g., the accessory 10) operatively connected with the electronic device 100.

Below, the recommended operation or an operation of selecting the second application will be described with reference to FIGS. 3 and 7 in detail.

According to an embodiment, the electronic device 100 may obtain the recommended operation (or the second application) by using a database of the context information. For example, the electronic device 100 may store the context information of the current operation in the database. The electronic device 100 may classify pieces of context information, which are stored in the database, into a plurality of segments based on the similarity between the pieces of context information. The electronic device 100 may obtain the recommended operation from one of the plurality of segments based on the context information about the current operation.

Below, an operation of generating the segment by classifying the context information will be described with reference to FIGS. 3 and 8 in detail.

According to an embodiment, the electronic device 100 may provide the identification information about the recommended operation to the external electronic device 200 by using the communication circuit 110. For example, the electronic device 100 may send, to the external electronic device 200 corresponding to the electronic device 100, the first information corresponding to the first application and the second information corresponding to the second application by using the communication circuit 110. The electronic device 100 may receive a request for the execution of the first application from the external electronic device 200 and may send, to the external electronic device 200, information about at least a part of a function of the first application and information about at least a part of a function of the second application based on the request for the execution. As another example, the electronic device 100 may send an indication of the recommended operation to the external electronic device 200 and may send the information about the icon of the recommended operation.

According to an embodiment, the electronic device 100 may provide content associated with the recommended operation together with the identification information about the recommended operation. For example, the electronic device 100 may provide the external electronic device 200 with content, which is output by using the first application or the second application by the electronic device 100, together with the first information about the first application and the second information about the second application.

According to various embodiments, the electronic device 100 may provide the external electronic device 200 with the identification information about a preliminary recommended operation. In the case where the external electronic device 200 requests a handoff, the electronic device 100 may provide the identification information about the recommended operation. For example, at first, the electronic device 100 may provide the external electronic device 200 with the identification information (e.g., the identification information about the accessory 10 associated with the current operation) about the preliminary recommended operation, which is generated based on a portion of the context information about the current operation. If a handoff request is received from the external electronic device 200, the electronic device 100 may connect the electronic device 100 with the external electronic device 200 by using the communication circuit 110. If the electronic device 100 is connected with the external electronic device 200, secondarily, the electronic device 100 may provide the external electronic device 200 with the identification information about the recommended operation, which is generated based on all the context information about the current operation.

As another example, at first, the electronic device 100 may send, to the external electronic device 200, a portion of the second information corresponding to a part (e.g., the second application, which is included in the same classification, from among a plurality of applications) of the second application selected based on the first information and the execution of the first application. The electronic device 100 may receive a request for execution of a part of the first application or second application from the external electronic device 200 through the communication circuit 110. In the case where the request for the execution is received, secondarily, the electronic device 100 may send, to the external electronic device 200, the remaining portion of the second information corresponding to the remaining part of the second application selected based on the execution of the first application.

A method of providing the handoff will be described with reference to FIG. 9 in detail.

The external electronic device 200 may operate in conjunction with the electronic device 100. The external electronic device 200 may perform an operation associated with an operation that is being performed at the electronic device 100. For example, the external electronic device 200 may receive the identification information about the recommended operation from the electronic device 100 and may perform the recommended operation based on the identification information. As another example, the external electronic device 200 may receive the first information corresponding to the first application and the second information corresponding to the second application from the electronic device 100 and may perform the first application and the second application based on the first information and the second information. As another example, the external electronic device 200 may be connected with the accessory 10 in response to an input of the identification information about the accessory 10.

The accessory 10 may be connected with the electronic device 100 or the external electronic device 200. If the information about the accessory 10 is provided to the external electronic device 200 by the electronic device 100, the accessory 10 may be connected with the external electronic device 200. The accessory 10 may include various devices, for example, a keyboard, a mouse, an earphone, and the like that are wirelessly connected to the electronic device 100 or the external electronic device 200.

The server 20 may be connected with the electronic device 100 over a communication network. The server 20 may provide the electronic device 100 with at least a portion of the context information about the current operation. The server 20 may be the web server 20 in which, for example, information about a type of an application or the accessory 10 is stored.

Figure 3:
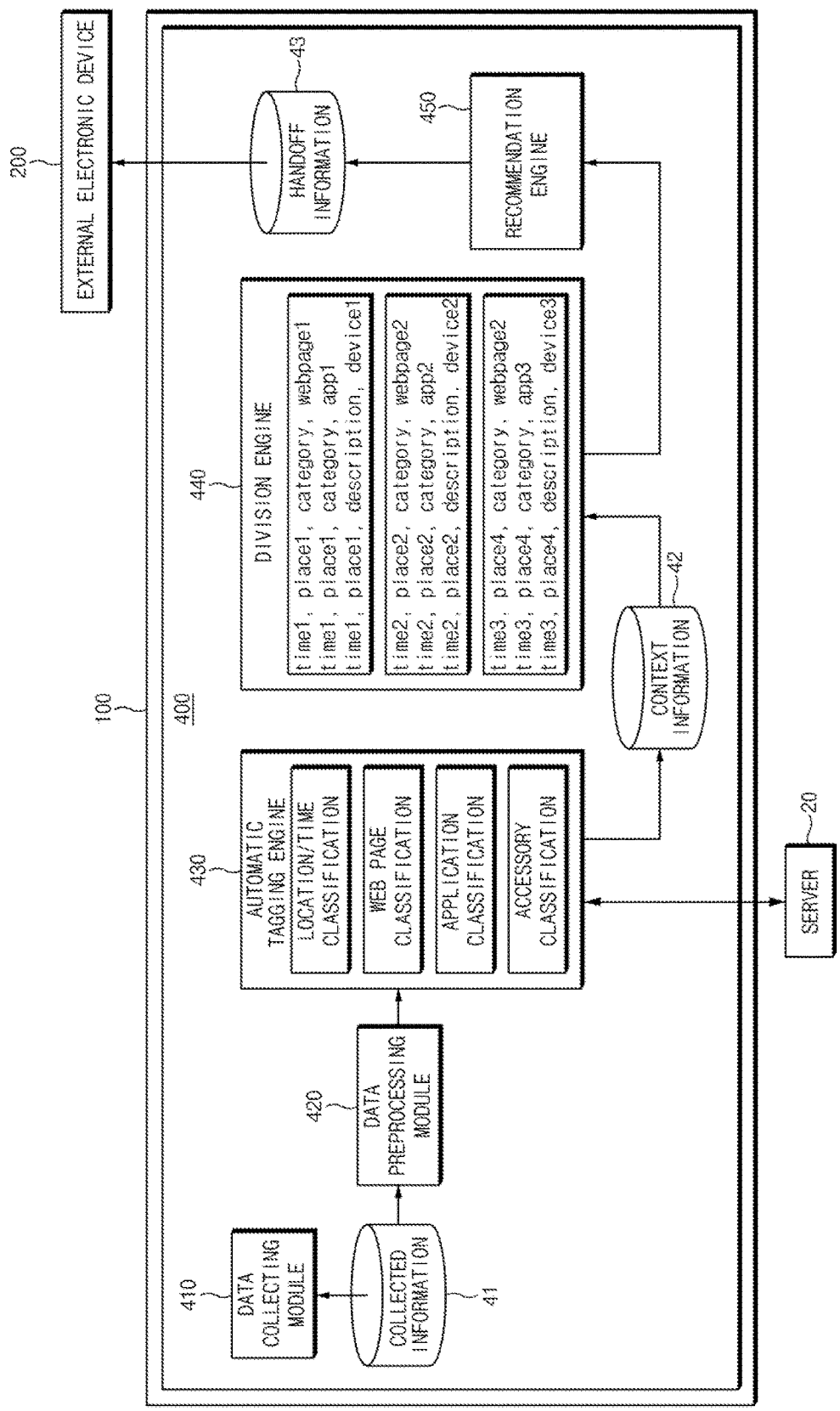
FIG. 3 is a block diagram of a program module that is stored in an electronic device according to an embodiment of the present disclosure.

FIG. 3 is a block diagram of a program module that is stored in an electronic device according to an embodiment of the present disclosure.

Referring to FIG. 3, the electronic device 100 may include a program module 400 that includes, for example, a data collecting module 410, a data preprocessing module 420, an automatic tagging engine 430, a division engine 440, and a recommendation engine 450. The electronic device 100 may communicate with the external electronic device 200 and the server 20.

The data collecting module 410 may collect information about a current operation. For example, the data collecting module 410 may collect information about a package name, a usage frequency, usage duration, or the like of an executed application. As another example, the data collecting module 410 may collect information about a uniform resource locater (URL), connection duration, a scroll location, or the like of a web page that is connected through the performed browser. As another example, the data collecting module 410 may collect information about an accessory connected with the electronic device 100. As another example, the data collecting module 410 may collect location information of the electronic device 100. Collected information 41 collected by the data collecting module 410 may be stored in the electronic device 100 (e.g., the memory 120).

The data preprocessing module 420 may preprocess the collected information 41. For example, the data preprocessing module 420 may convert the collected information 41 in the form that is easy for the automatic tagging engine 430 to analyze.

The automatic tagging engine 430 may generate context information 42 by using the collected information 41. For example, the automatic tagging engine 430 may extract information about a category of the application executed by using the package name of the executed application. The automatic tagging engine 430 may obtain information about a type of an application (e.g., an education, a piece of news, a game, or the like) executed by the server 20 of an application store. As another example, the automatic tagging engine 430 may obtain information about a type of content (e.g., a piece of news, a mail, a blog, a cafe, or the like) included in a web page by analyzing a text of the web page connected thereto. As another example, the automatic tagging engine 430 may obtain information about a place (e.g., home, an office, or the like), at which the electronic device 100 is located, by using the location information of the electronic device 100. As another example, the automatic tagging engine 430 may obtain information about a time zone (e.g., 9:00 to 10:00, 12:00 to 13:00, or the like) in which an application or the web page is used. As another example, the automatic tagging engine 430 may obtain the information about the accessory connected with the electronic device 100. The context information 42 obtained by the automatic tagging engine 430 may be stored in the electronic device 100 (e.g., the memory 120).

The division engine 440 may divide the context information 42 by relevant minimum units. For example, the division engine 440 may generate a segment, which includes the context information 42 and other pieces of context information, based on at least one or more of the type of the application, a type of a web page, a type of an accessory, an execution place, or an execution time that are included in the context information 42. The division engine 440 may apply different weights to classification standards such as the type of the application, the type of the web page, the type of the accessory, the execution place, the execution time, and the like. For example, as illustrated in FIG. 3, the division engine 440 may generate the segment, which includes the pieces of context information, in which the execution place and execution time are the same as each other. The division engine 440 may generate the segment that includes the pieces of context information that have the same application type. The division engine 440 may generate the segment that includes the pieces of context information that have the same web page type. The division engine 440 may store the generated segments in segment pool.

The recommendation engine 450 may recommend operations, which have the high similarity with the current operation, based on the context information 42 about the current operation. For example, the recommendation engine 450 may compare the segment with the context information 42 about the current operation. The recommendation engine 450 may calculate similarity of the segment with the context information 42 about the current operation and based on an item such as the type of the application, the type of the web page, the type of the accessory, the execution place, or the execution time, or the like. When calculating the similarity, the recommendation engine 450 may respectively assign different weights to items such as the type of the application, the type of the web page, the type of the accessory, the execution place, the execution time, and the like. The recommendation engine 450 may calculate the similarity of the segment, of which the execution time and the execution place are the same as, for example, those of the current operation such that the similarity of the segment becomes higher. The recommendation engine 450 may select a segment having the high similarity and may recommend operations included in the segment. The recommendation engine 450 may generate the handoff information 43 (or the identification information) about the recommended operation. The handoff information 43 generated by the recommendation engine 450 may be stored in the electronic device 100 (e.g., the memory 120). The handoff information 43 may be sent to the external electronic device 200.

The program module 400, when executed by the processor 130 of the electronic device 100, may perform the above-described operations.

Figure 4:
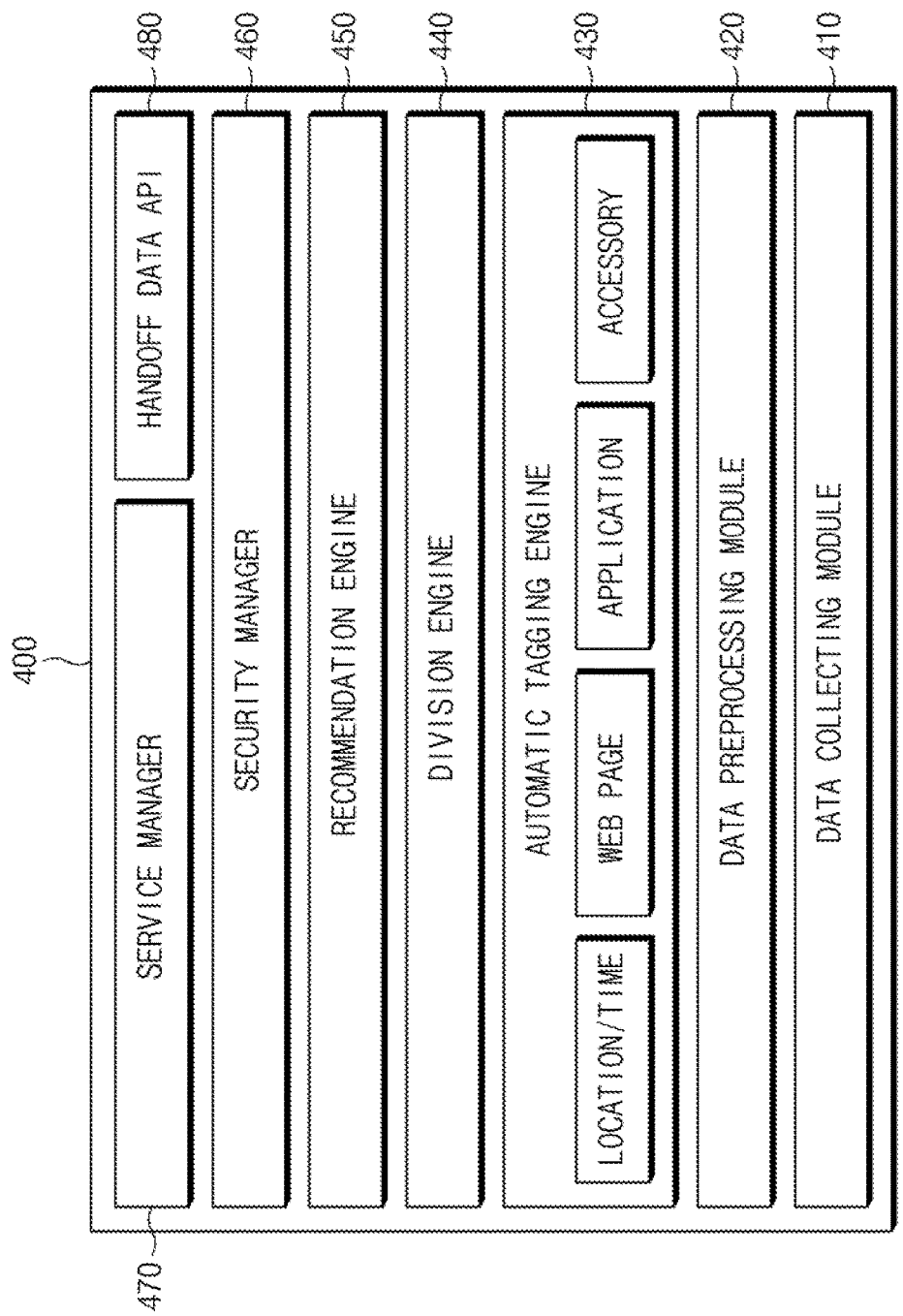
FIG. 4 is a hierarchy diagram of a program module that is stored in an electronic device according to an embodiment of the present disclosure.

FIG. 4 is a hierarchy diagram of a program module that is stored in an electronic device according to an embodiment of the present disclosure. For convenience of description, a description that is the same as that of a configuration given with reference to FIG. 3 will not be repeated here.

Referring to FIG. 4, the electronic device 100 may include the program module 400 that includes, for example, the data collecting module 410, the data preprocessing module 420, the automatic tagging engine 430, the division engine 440, the recommendation engine 450, a security manager 460, a service manager 470, and a handoff data application programming interface (API) 480.

The data collecting module 410 may obtain collected information about a current operation. The obtained collected information may be sent to the data preprocessing module 420.

The data preprocessing module 420 may preprocess the collected information about the current operation and may send the preprocessed collected information to the automatic tagging engine 430.

The automatic tagging engine 430 may generate context information by using the collected information 41 about the current operation. The generated context information may be sent to the division engine 440.

The division engine 440 may classify and store pieces of context information. The division engine 440 may classify the pieces of context information based on similarity between the pieces of context information and may generate a segment including pieces of context information each of which is similar to each other. A segment poll being a set of the segment may be used by the recommendation engine 450.

The recommendation engine 450 may recommend operations, each of which has high similarity with the current operation, by using the segment poll. Handoff information (or identification information) about the recommended operation may be sent to a security manager 460.

The security manager 460 may manage pieces of information each of which indicates that a handoff is prohibited according to user settings. For example, the security manager 460 may verify the handoff information about an operation, in which the handoff is prohibited, from among recommended operations and may block the handoff information about the corresponding operation.

When a specified event occurs, the service manager 470 may collect information or may analyze the collected information. The service manager 470 may periodically collect information or may periodically analyze the collected information. The service manager 470 may collect information or may analyze the collected information, by using, for example, the data collecting module 410 or the division engine 440. The service manager 470 may set permission to access another application for the collected information, the context information, or the handoff information.

The handoff data API 480 may manage data API for providing the handoff. The handoff information may be sent to the external electronic device 200 by the handoff data API 480.

When the program module 400 is performed by a processor of the electronic device 100, the program module 400 may perform the operations.

Figure 5:
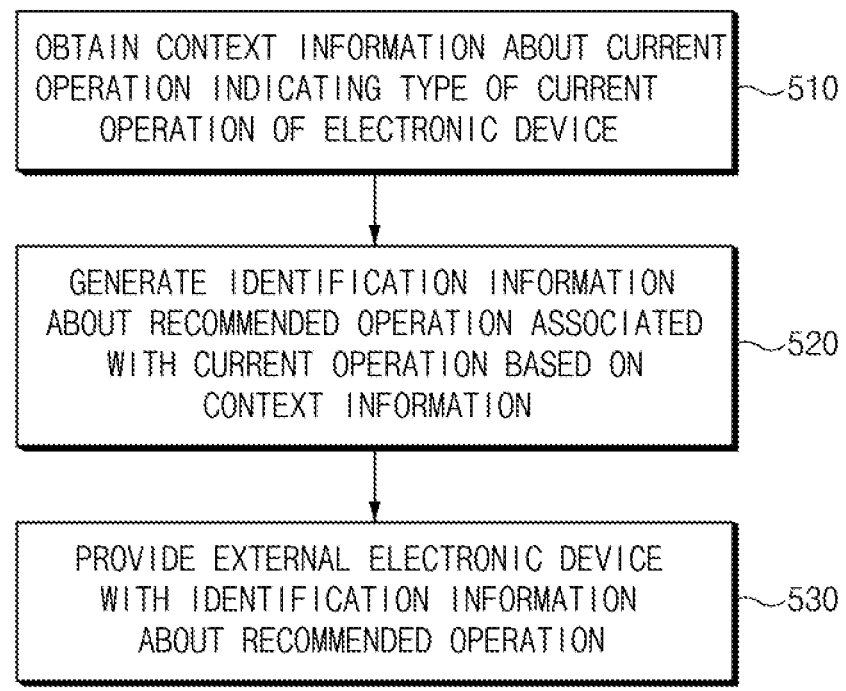
FIG. 5 is a flowchart for describing a handoff function provision method of an electronic device according to an embodiment of the present disclosure.

FIG. 5 is a flowchart for describing a handoff function provision method of an electronic device according to an embodiment of the present disclosure.

The flowchart illustrated in FIG. 5 may include operations that the electronic device 100 illustrated in FIGS. 1 and 2 processes. Even though omitted below, therefore, contents of the electronic device 100 described with reference to FIG. 1 or 2 may be applied to the flowchart shown in FIG. 5.

Referring to FIG. 5, in operation 510, the electronic device 100 (e.g., the processor 130) may obtain context information about a current operation indicating a type of a current operation that is being performed at the electronic device 100.

For example, the electronic device 100 may collect information about the current operation that is being performed at the electronic device 100. The collected information may include information about at least one or more of an application associated with the current operation, a web page, the accessory 10, or a time and a location. For example, the collected information may indicate that a word processor is executed on first coordinates (e.g., longitude and latitude information, or location information on an indoor map) at 14:10. As another example, the collected information may indicate that a mobile messenger is executed on second coordinates at 18:20 with an earphone connected with the electronic device 100. As another example, the collected information may indicate that the electronic device 100 is connected with ten web pages, each of which has a specific URL, on third coordinates at 12:40.

The electronic device 100 may obtain the context information about the current operation by using the collected information. The obtained context information may include information about at least one or more of a type of an application associated with the current operation, a type of a web page, the accessory 10, or a time and a place. For example, the context information may indicate that a text edit program is executed in an office of a user between 14:00 and 15:00. As another example, the context information may indicate that a social network service (SNS) application is executed in a house of the user between 18:00 and 19:00 with a Bluetooth earphone connected with the electronic device 100. As another example, the context information may indicate that a web page of a piece of sports news is read in the office of the user between 12:00 and 13:00.

In operation 520, the electronic device 100 (e.g., the processor 130) may generate identification information about a recommended operation associated with the current operation based on the context information. The electronic device 100 may select the recommended operation associated with the current operation by using the context information. The electronic device 100 may select an operation different from the current operation as the recommended operation and may select only a part of the current operation as the recommended operation.

For example, in the case where the number of times that a spreadsheet edit program is executed in the office of the user together with the word processor is high, the electronic device 100 may select the execution of the word processor and the execution of the spreadsheet edit program as the recommended operation. In addition, in the case where the number of times that a Bluetooth keyboard is connected with the electronic device 100 during the execution of the word processor is high, the electronic device 100 may select the execution of the word processor and the connection of the Bluetooth keyboard as the recommended operation.

As another example, in the case where the number of times that the SNS application is executed together with a music playback application with the Bluetooth earphone connected with the electronic device 100 is high, the electronic device 100 may select the execution of the mobile messenger, the execution of the music playback application, and the connection of the Bluetooth earphone as the recommended operation.

As another example, in the case where the number of times that the web page of a piece of sports news is read in the office of the user between 12:00 and 13:00 is high, the electronic device 100 may select reading of five web pages, which are associated with a piece of sports news, from among ten web pages as the recommended operation.

As another example, the electronic device 100 may be connected with the Bluetooth keyboard and may execute a web browser. In the case where it is determined that the number of times that the Bluetooth keyboard is used during the execution of the web browser is low, based on the context information or where the number of times that the Bluetooth keyboard is connected with the electronic device 100 during the execution of the web browser is low, the electronic device 100 may not select the connection of the Bluetooth keyboard as the recommended operation but select only the execution of the web browser as the recommended operation. Alternatively, in the case where the Bluetooth keyboard is connected with the electronic device 100 but is not used, the electronic device 100 may not select the connection of the Bluetooth keyboard as the recommended operation but select only the execution of the web browser as the recommended operation. That is, the electronic device 100 may provide a handoff a part of an operation, which is being performed at the electronic device 100, based on the context information.

The electronic device 100 may generate the identification information about the recommended operation such that the external electronic device 200 identifies the recommended operation and executes the recommended operation. The identification information may include information about at least one of, for example, an application package name associated with the recommended operation, an URL of a web site, or the accessory 10.

In operation 530, the electronic device 100 (e.g., the processor 130) may provide the external electronic device 200 with the identification information about the recommended operation. The electronic device 100 may provide the identification information to an external device by using a local-area communication manner (e.g., BLE, Wi-Fi direct, NFC, or the like). The external electronic device 200 may execute the recommended operation based on the provided identification information.

Figure 6:
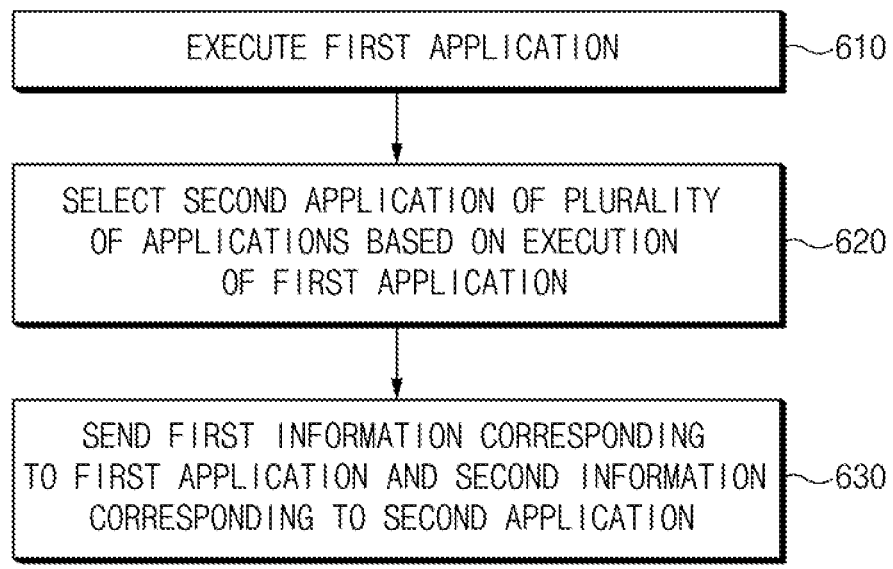
FIG. 6 is a flowchart for describing a handoff function provision method of an electronic device according to an embodiment of the present disclosure.

FIG. 6 is a flowchart for describing a handoff function provision method of an electronic device according to an embodiment of the present disclosure.

The flowchart illustrated in FIG. 6 may include operations that the electronic device 100 illustrated in FIGS. 1 to 2 processes. Even though omitted below, therefore, contents of the electronic device 100 described with reference to FIG. 1 or 2 may be applied to the flowchart shown in FIG. 6.

Referring to FIG. 6, in operation 610, the electronic device 100 (e.g., the processor 130) may execute a first application. For example, the electronic device 100 may execute a Facebook application.

In operation 620, the electronic device 100 (e.g., the processor 130) may select a second application of a plurality of applications based on the execution of the first application. According to an embodiment, the electronic device 100 may verify context information associated with the execution of the first application. In the case where the context information satisfies a specified condition, the electronic device 100 may select the second application. For example, the electronic device 100 may verify context information associated with the execution of the Facebook application. In the case where the number of times that a music playback application is executed together with the Facebook application is greater than a value of a specified condition, the electronic device 100 may select the music playback application as the second application. As another example, in the case where the number of times that a Bluetooth earphone is connected with the electronic device 100 during the execution of the Facebook application is greater than the value of the specified condition, the electronic device 100 may select an application, which sets the connection with the Bluetooth earphone, as the second application.

In operation 630, the electronic device 100 (e.g., the processor 130) may send the first information corresponding to the first application and the second information corresponding to the second application to the external electronic device 200. For example, the electronic device 100 may send information corresponding to the Facebook application as the first information such that the external electronic device 200 executes the Facebook application. In addition, the electronic device 100 may send information corresponding to the music playback application as the second information such that the external electronic device 200 executes the music playback application. Furthermore, the electronic device 100 may send information corresponding to the application, which sets the connection with the Bluetooth earphone, as the second information such that the external electronic device 200 sets the connection with the Bluetooth earphone.

According to an embodiment, the electronic device 100 may receive a request for execution of the first application from the external electronic device 200 and may send, to the external electronic device 200, information about at least a part of a function of the first application and information about at least a part of a function of the second application based on the request for the execution. For example, only if the electronic device 100 receives the request for the execution from the external device, the electronic device 100 may send the first information and the second information to the external electronic device 200. In the case where the first application is a web browser connected with ten web pages, the electronic device 100 may send information associated with a part of ten web pages to the external electronic device 200. Also, in the case where the second application includes the music playback application and a mobile messenger, the electronic device 100 may send information associated with one of the music playback application and the mobile messenger to the external electronic device 200.

Figure 7:
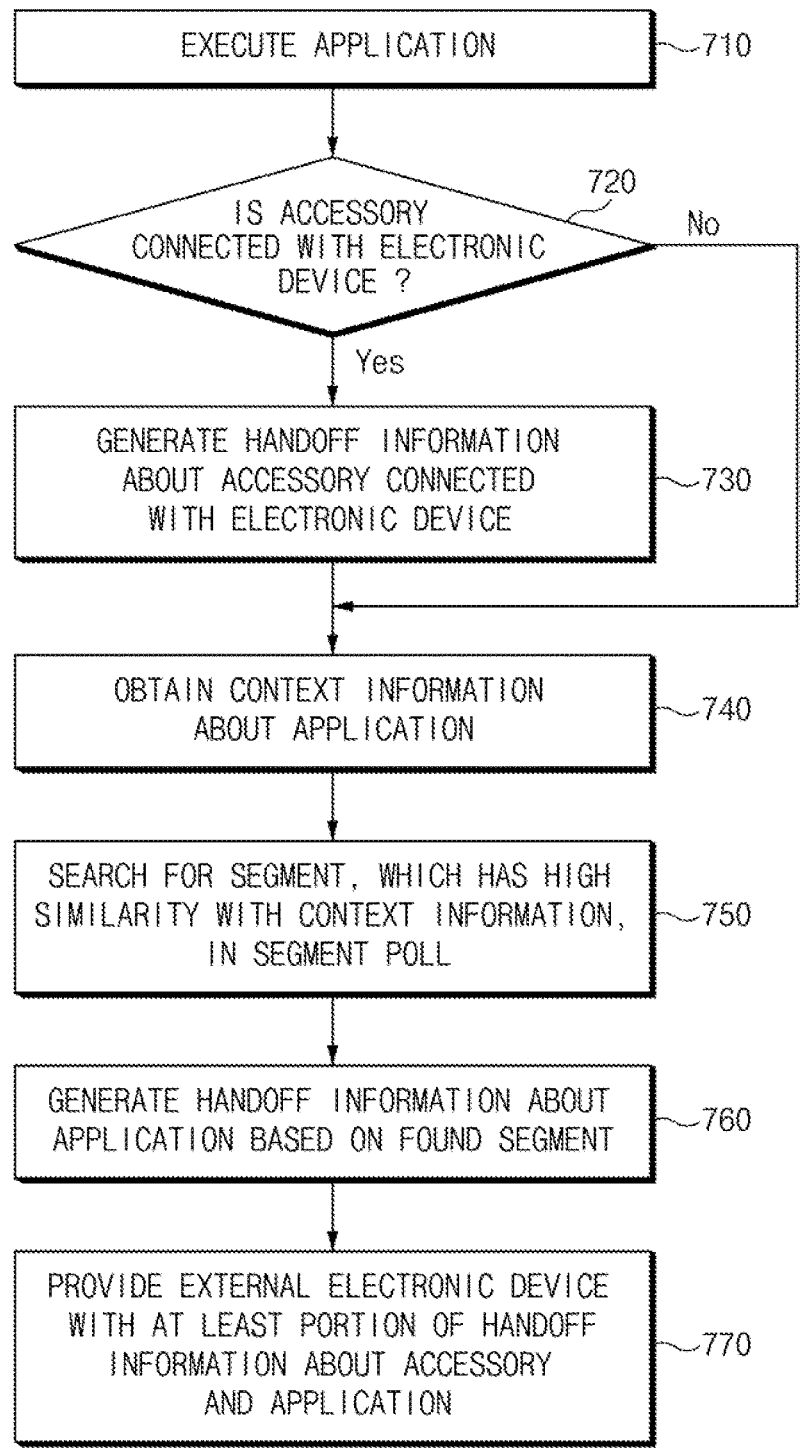
FIG. 7 is a flowchart for describing a handoff function provision method of an electronic device according to an embodiment of the present disclosure.

FIG. 7 is a flowchart for describing a handoff function provision method of an electronic device according to an embodiment of the present disclosure. For descriptive convenience, a description for the operation described with reference to FIGS. 5 and 6 is not repeated here.

The flowchart illustrated in FIG. 7 may include operations that the electronic device 100 illustrated in FIGS. 1 and 2 processes. Even though omitted below, therefore, contents of the electronic device 100 described with reference to FIG. 1 or 2 may be applied to the flowchart shown in FIG. 7.

Referring to FIG. 7, in operation 710, the electronic device 100 (e.g., the processor 130) may execute an application. For example, the electronic device 100 may execute a word processor.

In operation 720, the electronic device 100 (e.g., the processor 130) may determine whether the accessory 10 is connected with the electronic device 100. The electronic device 100 may verify that the accessory 10, such as a wireless earphone, a wireless keyboard, a wireless mouse, or the like, is connected with, for example, the electronic device 100.

In the case where the accessory 10 is connected with the electronic device 100, in operation 730, the electronic device 100 (e.g., the processor 130) may generate handoff information about the accessory 10 connected with the electronic device 100. For example, in the case where the electronic device 100 is connected with a Bluetooth keyboard, the electronic device 100 may generate handoff information about the Bluetooth keyboard.

In operation 740, the electronic device 100 (e.g., the processor 130) may obtain context information about the application. In the case where it is determined that the accessory 10 is not connected with the electronic device 100 after operation 730 or in operation 720, the electronic device 100 may perform operation 750. For example, the electronic device 100 may obtain the context information about the word processor.

In operation 750, the electronic device 100 (e.g., the processor 130) may search for a segment, which has high similarity with the context information, in a segment poll. For example, the electronic device 100 may compare the context information stored in the segment with the context information about the word processor and may search for a segment, which includes context information having the highest similarity with the context information about the word processor, based on the compared result. The found segment may include context information about, for example, a spreadsheet edit program, the accessory 10 when connected with the electronic device, such as a Bluetooth earphone, or the like.

In operation 760, the electronic device 100 (e.g., the processor 130) may generate handoff information about the application based on the found segment. For example, the electronic device 100 may generate handoff information about the word processor, the spreadsheet edit program, and the like. In addition, the electronic device 100 may generate handoff information about the accessory 10 when connected with the electronic device, such as the Bluetooth earphone or the like.

In operation 770, the electronic device 100 (e.g., the processor 130) may provide the external electronic device 200 with at least a portion of handoff information about the accessory 10 (when connected) and the application. For example, the electronic device 100 may provide the external electronic device 200 with handoff information about the word processor, the spreadsheet edit program, the accessory 10 when connected with the electronic device, such as the Bluetooth earphone, or the like. As another example, in the case where the Bluetooth earphone is connected with the electronic device 100, but is not used, the electronic device 100 may provide the external electronic device 200 with only the handoff information about the word processor, the spreadsheet edit program, and the like, and may not provide the handoff information about the Bluetooth earphone. As another example, in the case where it is determined that the number of times that the Bluetooth earphone is connected with the electronic device 100 during the execution of the word processor is low, based on the context information, the electronic device 100 may provide the external electronic device 200 with only the handoff information about the word processor, the spreadsheet edit program, and the like, and may not provide the handoff information about the Bluetooth earphone. The electronic device 100 may provide the external electronic device 200 with, for example, the handoff information by using a communication scheme such as BLE, Wi-Fi direct, NFC, or the like.

Figure 8:
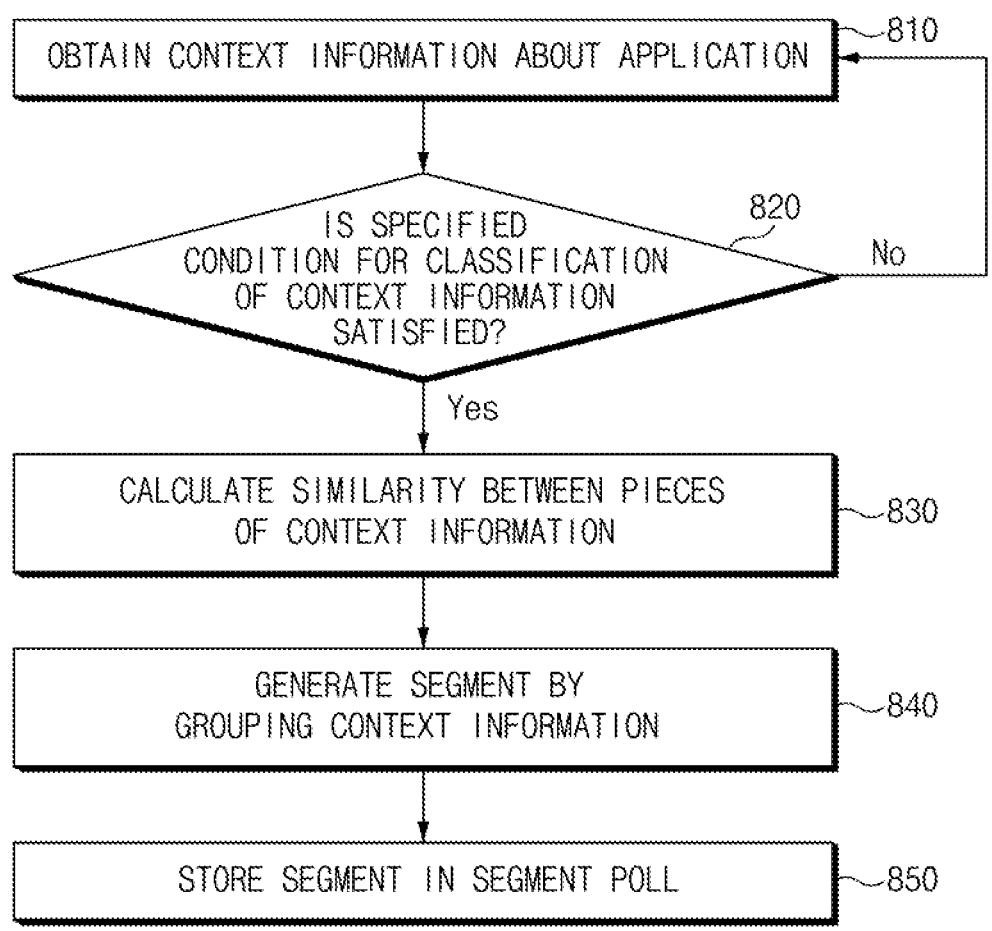
FIG. 8 is a flowchart for describing a handoff function provision method of an electronic device according to an embodiment of the present disclosure.

FIG. 8 is a flowchart for describing a handoff function provision method of an electronic device according to an embodiment of the present disclosure. For convenience of description, a detailed description about a configuration described with reference to FIG. 7 will not be repeated here.

The flowchart illustrated in FIG. 8 may include operations that the electronic device 100 illustrated in FIGS. 1 and 2 processes. Even though omitted below, therefore, contents of the electronic device 100 described with reference to FIG. 1 or 2 may be applied to the flowchart shown in FIG. 8.

Referring to FIG. 8, in operation 810, the electronic device 100 (e.g., the processor 130) may obtain context information about an application. The electronic device 100 may periodically classify pieces of context information into a plurality of segments or may classify the pieces of context information into the plurality of segments if a specified condition is satisfied, by performing operations to be described below.

In operation 820, the electronic device 100 (e.g., the processor 130) may determine whether the specified condition for the classification of the context information is satisfied. For example, the electronic device 100 may determine whether a specified period arrives. As another example, the electronic device 100 may determine whether a specified event occurs.

In the case where the specified condition is satisfied, in operation 830, the electronic device 100 (e.g., the processor 130) may calculate similarity between pieces of context information. For example, whenever the application is executed at the electronic device 100, the electronic device 100 may consistently store the context information about the executed application. In the case where the specified period arrives or where the specified event occurs, the electronic device 100 may calculate the similarity between the stored pieces of context information. The electronic device 100 may calculate the similarity between the pieces of context information based on an item, for example, a type of an application, a type of a web page, an execution place, an execution time, the accessory 10 connected with the electronic device 100, and the like. The electronic device 100 may assign a weight, which is different for each item, when the similarity is calculated. In the case where the specified condition is not satisfied, the electronic device 100 (e.g., the processor 130) returns to operation 810 to obtain context information about the application, as described above.

In operation 840, the electronic device 100 (e.g., the processor 130) may generate the segment by grouping the context information. For example, the electronic device 100 may generate the segment by grouping the pieces of context information calculated such that the similarity is higher than the specified value.

In operation 850, the electronic device 100 (e.g., the processor 130) may store the segment in a segment poll. The stored segment may be used when the electronic device 100 selects another application (or a recommended operation) by using the context information of the executed application (or a current operation).

Figure 9:
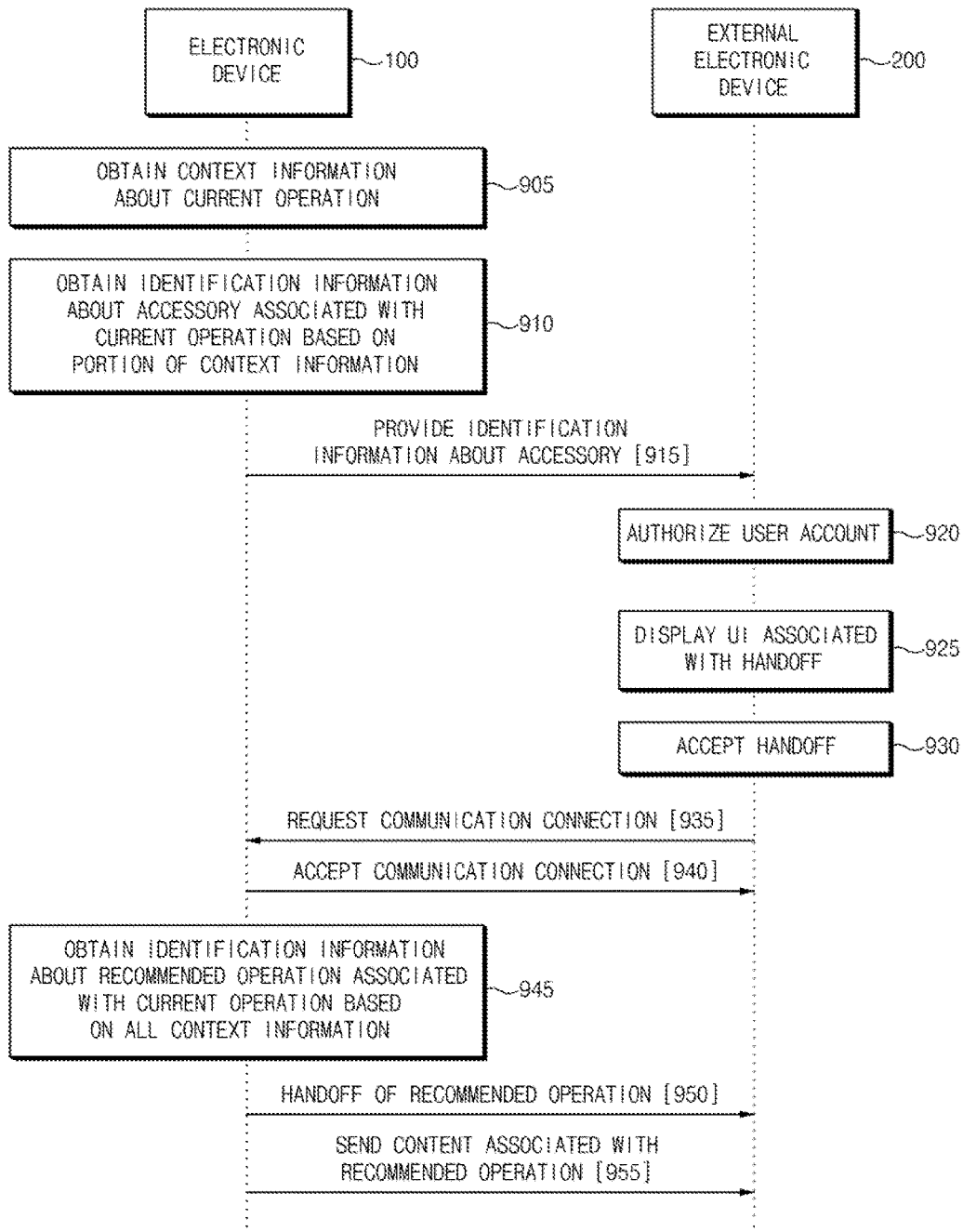
FIG. 9 is a flowchart for describing a handoff function provision method of an electronic device according to an embodiment of the present disclosure.
Figure 10:
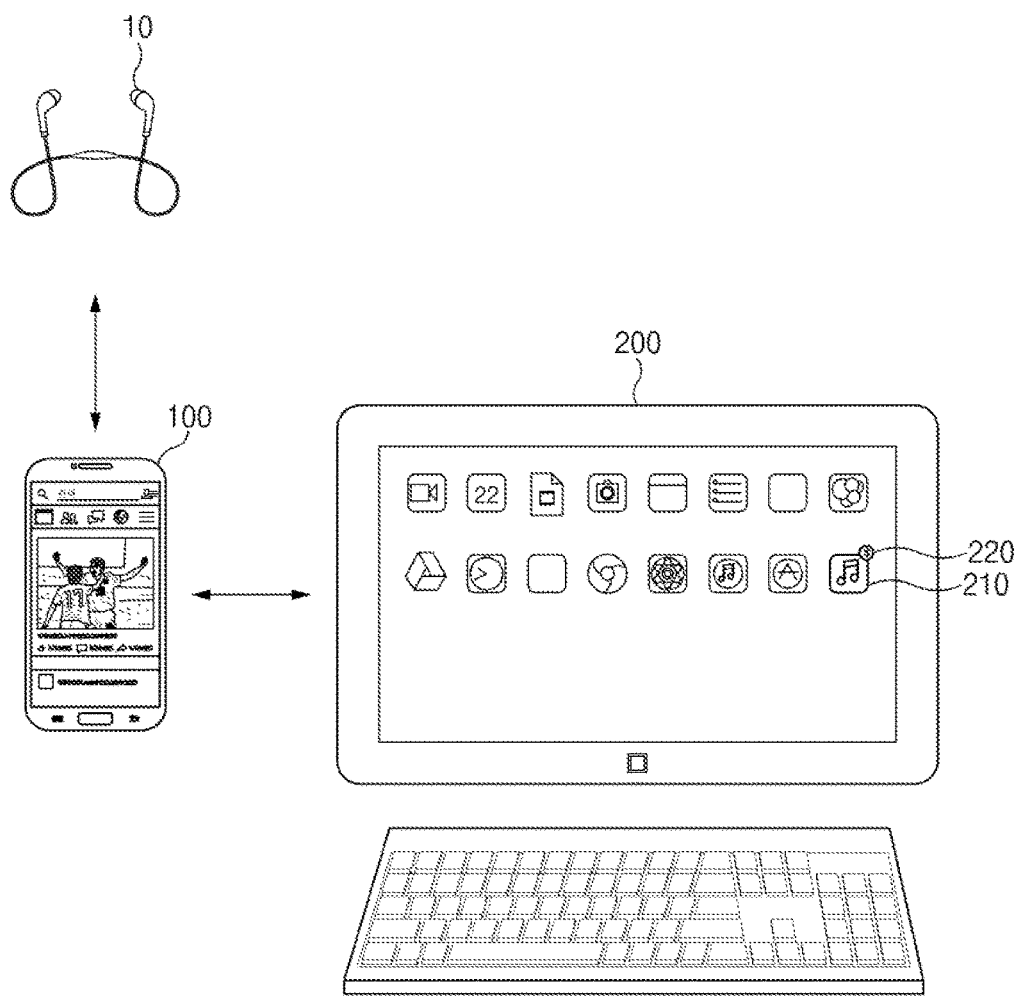
FIG. 10 illustrates a user interface provided at an external device connected with an electronic device according to an embodiment of the present disclosure.

FIG. 9 is a flowchart for describing a handoff function provision method of an electronic device according to an embodiment of the present disclosure. FIG. 10 illustrates a user interface (UI) provided at an external electronic device connected with an electronic device according to an embodiment of the present disclosure. For convenience of description, a detailed description about an operation described with reference to FIGS. 5 to 8 will not be repeated here.

The flowchart illustrated in FIG. 9 may include operations that the electronic device 100 illustrated in FIGS. 1 and 2 processes. Even though omitted below, therefore, contents of the electronic device 100 described with reference to FIG. 1 or 2 may be applied to the flowchart shown in FIG. 9.

Referring to FIG. 9, in operation 905, the electronic device 100 may obtain context information about a current operation. For example, the electronic device 100 may obtain context information about a music playback application.

In operation 910, the electronic device 100 may obtain identification information about the accessory 10 associated with the current operation based on a portion of the context information. For example, in the case where the number of times that a Bluetooth earphone is used during execution of a Facebook application is high, the electronic device 100 may obtain identification information about the Bluetooth earphone. The electronic device 100 may rapidly obtain the identification information by obtaining the identification information about only a part of the accessory 10 during a recommended operation.

In operation 915, the electronic device 100 may provide the external electronic device 200 with information about the accessory 10. For example, primarily, the electronic device 100 may send the identification information about the accessory 10 to the external electronic device 200.

In operation 920, the external electronic device 200 may authorize a user account by, for example, determining whether a user account of the electronic device 100 is the same as a user account of the external electronic device 200. In this example, only if the user account of the electronic device 100 is the same as the user account of the external electronic device 200, may the external electronic device 200 approve a handoff for security. However, the present disclosure is not so limited, and the external device 200 may employ other authorization schemes without departing from the teachings of the disclosure.

In operation 925, the external electronic device 200 may display an UI associated with the handoff. For example, the external electronic device 200 may display a popup or an icon for receiving an acceptance command of the handoff. According to an embodiment, the electronic device 100 may display an object associated with a second application on the external electronic device 200 in connection with an object associated with a first application displayed on the external electronic device 200.

Referring to FIG. 10, the electronic device 100 may perform the Facebook application. The electronic device 100 may perform the music playback application in the background. The electronic device 100 may be operatively connected with an accessory 10, illustrated in FIG. 10 as a Bluetooth earphone. In this case, the electronic device 100 may provide the identification information about the Bluetooth earphone to the external electronic device 200.

The external electronic device 200 may display an icon 210 of the music playback application. In the case where the external electronic device 200 receives the identification information about the Bluetooth earphone, the external electronic device 200 may display an icon 220 of the Bluetooth earphone so as to be overlapped with the icon 210 of the music playback application to identify the connection with the Bluetooth earphone.

Returning to FIG. 9, in operation 930, the external electronic device 200 may receive the acceptance command of the handoff of the user. According to an embodiment, the electronic device 100 may receive an execution request for the first application from the external electronic device 200 through the object associated with the second application displayed on the external electronic device 200. For example, the external electronic device 200 may receive an input to the icon 220 of the Bluetooth earphone of the user as the acceptance command of the handoff.

In operation 935, the external electronic device 200 may request a communication connection from the electronic device 100. For example, the external electronic device 200 may request the communication connection using a communication scheme such as BLE, Wi-Fi direct, NFC, or the like.

Operations 910 to 935 may be omitted according to an implementation form of the present disclosure.

In operation 940, the electronic device 100 may set the communication connection with the external electronic device 200. The electronic device 100 may communicate with the external electronic device 200 based on a communication scheme that the external electronic device 200 requests.

In operation 945, the electronic device 100 may obtain the identification information about the recommended operation associated with the current operation based on all the context information. For example, the electronic device 100 may obtain the identification information about the Facebook application and the music playback application.

In operation 950, the electronic device 100 may provide the handoff of the recommended operation. For example, secondarily, the electronic device 100 may send the identification information about all the recommended operation to the external electronic device 200.

In operation 955, the electronic device 100 may send content associated with the recommended operation to the external electronic device 200. For example, in the case where the electronic device 100 provides the external electronic device 200 with the handoff of the music playback application, a music application of the electronic device 100 may send an audio file, which is being played, to the external electronic device 200.

According to various embodiments of the present disclosure, a handoff on at least a part of a current operation of an electronic device or an operation associated with the current operation may be provided, thereby improving utilization of a handoff function.

In addition, an operation having high similarity is selected by using the context information about the current operation, thereby providing the handoff to which usage habits of the user is applied.

Also, after the handoff on the accessory is provided, the handoff on an operation associated with the current operation may be provided to only an external electronic device that requests the handoff, thereby reducing computational complexity requested for the handoff.

Besides, a variety of effects directly or indirectly understood through this disclosure may be provided.

Figure 11:
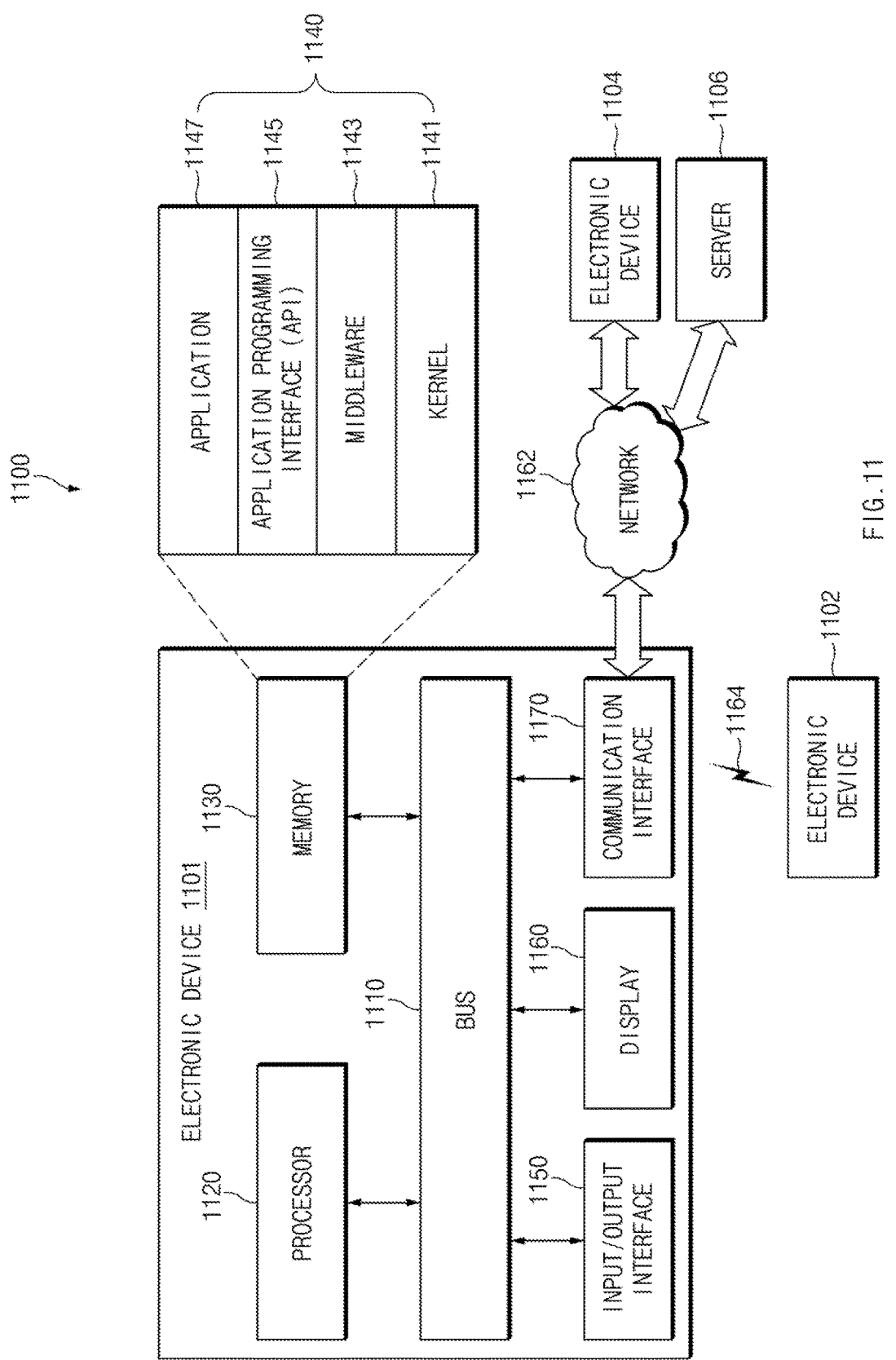
FIG. 11 illustrates an electronic device in a network environment according to various embodiments of the present disclosure.

FIG. 11 illustrates an electronic device in a network environment according to various embodiments of the present disclosure.

An electronic device 1101 in a network environment 1100 according to various embodiments of the present disclosure will be described with reference to FIG. 11. The electronic device 1101 may include a bus 1110, a processor 1120, a memory 1130, an input/output interface 1150, a display 1160, and a communication interface 1170. In various embodiments of the present disclosure, at least one of the foregoing elements may be omitted or another element may be added to the electronic device 1101.

The bus 1110 may include a circuit for connecting the above-mentioned elements 1110 to 1170 to each other and transferring communications (e.g., control messages and/or data) among the above-mentioned elements.

The processor 1120 may include at least one of a central processing unit (CPU), an application processor (AP), or a communication processor (CP). The processor 1120 may perform data processing or an operation related to communication and/or control of at least one of the other elements of the electronic device 1101.

The memory 1130 may include a volatile memory and/or a nonvolatile memory. The memory 1130 may store instructions or data related to at least one of the other elements of the electronic device 1101. According to an embodiment of the present disclosure, the memory 1130 may store software and/or a program 1140. The program 1140 may include, for example, a kernel 1141, a middleware 1143, an application programming interface (API) 1145, and/or an application program (or an application) 1147. At least a portion of the kernel 1141, the middleware 1143, or the API 1145 may be referred to as an operating system (OS).

The kernel 1141 may control or manage system resources (e.g., the bus 1110, the processor 1120, the memory 1130, or the like) used to perform operations or functions of other programs (e.g., the middleware 1143, the API 1145, or the application program 1147). In addition, the kernel 1141 may provide an interface for allowing the middleware 1143, the API 1145, or the application program 1147 to access individual elements of the electronic device 1101 in order to control or manage the system resources.

The middleware 1143 may serve as an intermediary so that the API 1145 or the application program 1147 communicates and exchanges data with the kernel 1141.

Furthermore, the middleware 1143 may handle one or more task requests received from the application program 1147 according to a priority order. For example, the middleware 1143 may assign at least one application program 1147 a priority for using the system resources (e.g., the bus 1110, the processor 1120, the memory 1130, or the like) of the electronic device 1101. For example, the middleware 1143 may handle the one or more task requests according to the priority assigned to the at least one application, thereby performing scheduling or load balancing with respect to the one or more task requests.

The API 1145, which is an interface for allowing the application 1147 to control a function provided by the kernel 1141 or the middleware 1143, may include, for example, at least one interface or function (e.g., instructions) for file control, window control, image processing, character control, or the like.

The input/output interface 1150 may serve to transfer an instruction or data input from a user or another external device to another element (or other elements) of the electronic device 1101. Furthermore, the input/output interface 1150 may output instructions or data received from another element (or other elements) of the electronic device 1101 to the user or another external device.

The display 1160 may include, for example, a liquid crystal display (LCD), a light-emitting diode (LED) display, an organic LED (OLED) display, a plastic OLED (POLED), a microelectromechanical systems (MEMS) display, or an electronic paper display. The display 1160 may present various content (e.g., a text, an image, a video, an icon, a symbol, or the like) to the user. The display 1160 may include a touch screen, and may receive a touch, gesture, proximity or hovering input from an electronic pen or a part of a body of the user.

The communication interface 1170 may set communications between the electronic device 1101 and an external device (e.g., a first external electronic device 1102, a second external electronic device 1104, or a server 1106). For example, the communication interface 1170 may be connected to a network 1162 via wireless communications or wired communications so as to communicate with the external device (e.g., the second external electronic device 1104 or the server 1106).

The wireless communications may employ at least one of cellular communication protocols such as long-term evolution (LTE), LTE-advance (LTE-A), code division multiple access (CDMA), wideband CDMA (WCDMA), universal mobile telecommunications system (UMTS), wireless broadband (WiBro), or global system for mobile communications (GSM). The wireless communications may include, for example, a short-range communication link 1164. The short-range communication link may be implemented by at least one of wireless fidelity (Wi-Fi), Bluetooth (BT), near field communication (NFC), magnetic stripe transmission (MST), or global navigation satellite system (GNSS).

The MST may generate a pulse by using electro-magnetic signals according to transmission data, and the pulse may cause magnetic signals. The electronic device 1101 may transmit the magnetic signals to a point of sales (POS). The POS may detect the magnetic signals using a MST reader and obtain the transmission data by converting the magnetic signals to electronic signals.

The GNSS may include, for example, at least one of global positioning system (GPS), global navigation satellite system (GLONASS), BeiDou navigation satellite system (BeiDou), or Galileo, the European global satellite-based navigation system according to a use area or a bandwidth. Hereinafter, the term "GPS" and the term "GNSS" may be interchangeably used. The wired communications may include at least one of universal serial bus (USB), high definition multimedia interface (HDMI), recommended standard 232 (RS-232), plain old telephone service (POTS), or the like. The network 1162 may include at least one of telecommunications networks, for example, a computer network (e.g., local area network (LAN) or wide area network (WAN)), the Internet, or a telephone network.

Referring to FIG. 11, the types of the first external electronic device 1102 and the second external electronic device 1104 may be the same as or different from the type of the electronic device 1101. According to an embodiment of the present disclosure, the server 1106 may include a group of one or more servers. A portion or all of operations performed in the electronic device 1101 may be performed in one or more other electronic devices (e.g., the first electronic device 1102, the second external electronic device 1104, or the server 1106). When the electronic device 1101 should perform a certain function or service automatically or in response to a request, the electronic device 1101 may request at least a portion of the functions related to the function or service from another device (e.g., the first electronic device 1102, the second external electronic device 1104, or the server 1106) instead of or in addition to performing the function or service for itself. The other electronic device (e.g., the first electronic device 1102, the second external electronic device 1104, or the server 1106) may perform the requested function or additional function, and may transfer a result of the performance to the electronic device 1101. The electronic device 1101 may use a received result itself or additionally process the received result to provide the requested function or service. To this end, for example, a cloud computing technology, a distributed computing technology, or a client-server computing technology may be used.

Figure 12:
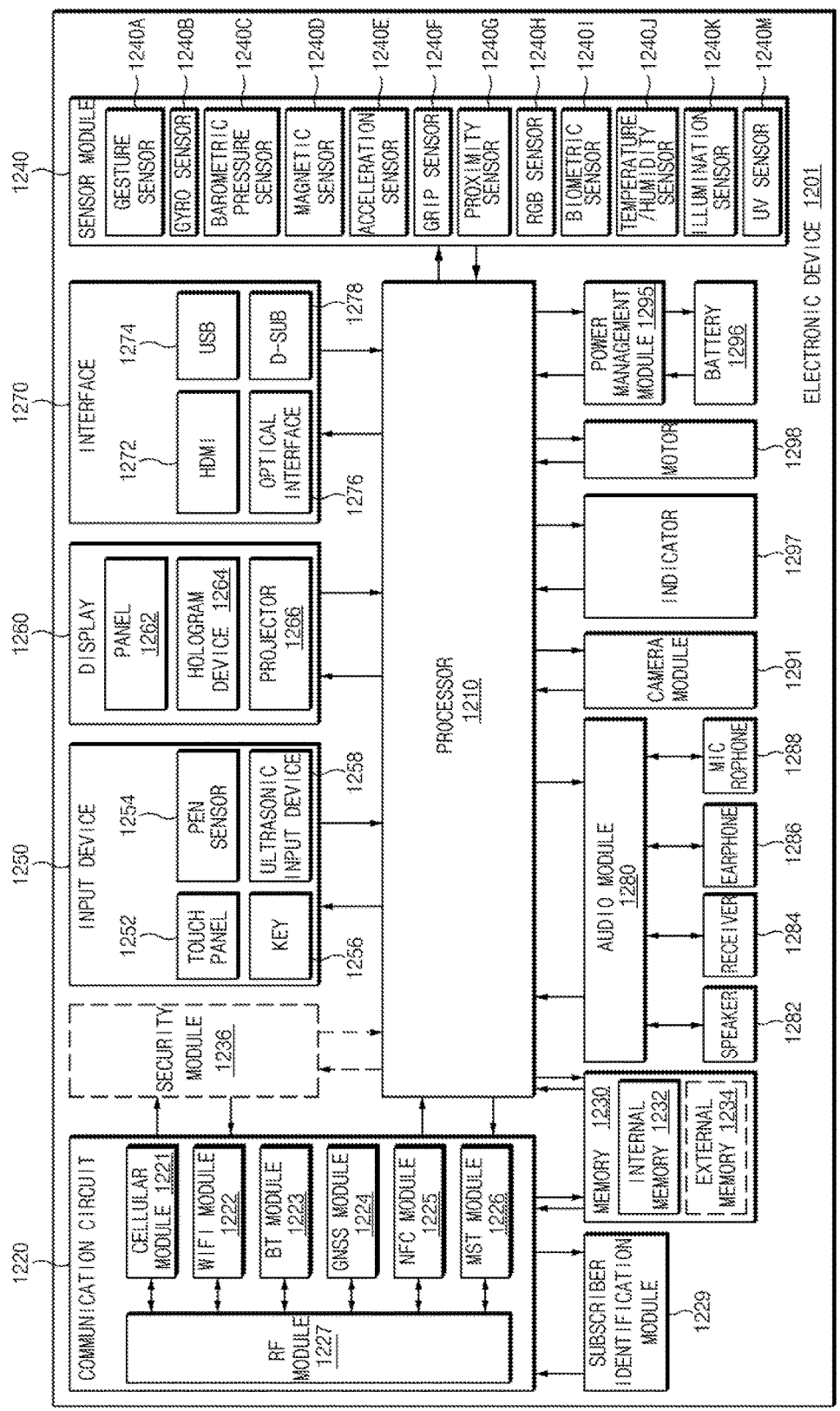
FIG. 12 illustrates a block diagram of an electronic device according to various embodiments of the present disclosure.

FIG. 12 illustrates a block diagram of an electronic device according to various embodiments of the present disclosure.

Referring to FIG. 12, an electronic device 1201 may include, for example, a part or the entirety of the electronic device 1101 illustrated in FIG. 11. The electronic device 1201 may include at least one processor (e.g., AP) 1210, a communication circuit 1220, a subscriber identification module (SIM) 1224, a memory 1230, a sensor module 1240, an input device 1250, a display 1260, an interface 1270, an audio module 1280, a camera module 1291, a power management module 1295, a battery 1296, an indicator 1297, and a motor 1298.

The processor 1210 may run an operating system (OS) or an application program so as to control a plurality of hardware or software elements connected to the processor 1210, and may process various data and perform operations. The processor 1210 may be implemented with, for example, a system on chip (SoC). According to an embodiment of the present disclosure, the processor 1210 may further include a graphic processing unit (GPU) and/or an image signal processor (ISP). The processor 1210 may include at least a portion (e.g., a cellular module 1221) of the elements illustrated in FIG. 12. The processor 1210 may load, on a volatile memory, an instruction or data received from at least one of other elements (e.g., a nonvolatile memory) to process the instruction or data, and may store various data in a nonvolatile memory.

The communication circuit 1220 may have a configuration that is the same as or similar to that of the communication interface 1170 of FIG. 11. The communication circuit 1220 may include, for example, a cellular module 1221 (e.g., a modem), a Wi-Fi module 1222, a Bluetooth (BT) module 1223, a GNSS module 1224 (e.g., a GPS module, a GLONASS module, a BeiDou module, or a Galileo module), an NFC module 1225, and a radio frequency (RF) module 1227.

The cellular module 1221 may provide, for example, a voice call service, a video call service, a text message service, or an Internet service through a communication network. The cellular module 1221 may identify and authenticate the electronic device 1201 in the communication network using the subscriber identification module (SIM) 1229 (e.g., a SIM card). The cellular module 1221 may perform at least a part of functions that may be provided by the processor 1210. The cellular module 1221 may include a communication processor (CP).

Each of the Wi-Fi module 1222, the BT module 1223, the GNSS module 1224, the NFC module 1225, and the MST module 1226 may include, for example, a processor for processing data transmitted/received through the modules. According to some various embodiments of the present disclosure, at least a part (e.g., two or more) of the cellular module 1221, the Wi-Fi module 1222, the BT module 1223, the GNSS module 1224, the NFC module 1225, and the MST module 1226 may be included in a single integrated chip (IC) or IC package.

The RF module 1227 may transmit/receive, for example, communication signals (e.g., RF signals). The RF module 1227 may include, for example, a transceiver, a power amp module (PAM), a frequency filter, a low noise amplifier (LNA), an antenna, or the like. According to another embodiment of the present disclosure, at least one of the cellular module 1221, the Wi-Fi module 1222, the BT module 1223, the GNSS module 1224, the NFC module 1225, or the MST module 1226 may transmit/receive RF signals through a separate RF module.

The SIM 1229 may include, for example, an embedded SIM and/or a card containing the subscriber identity module, and may include unique identification information (e.g., an integrated circuit card identifier (ICCID)) or subscriber information (e.g., international mobile subscriber identity (IMSI)).

The memory 1230 (e.g., the memory 1130 shown in FIG. 11) may include, for example, an internal memory 1232 or an external memory 1234. The internal memory 1232 may include at least one of a volatile memory (e.g., a dynamic random-access memory (DRAM), a static RAM (SRAM), a synchronous dynamic RAM (SDRAM), or the like), a nonvolatile memory (e.g., a one-time programmable read-only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, a NOR flash memory, or the like)), a hard drive, or a solid state drive (SSD).

The external memory 1234 may include a flash drive such as a compact flash (CF), a secure digital (SD), a micro-SD, a mini-SD, an extreme digital (xD), a multi-media card (MMC), a memory stick, or the like. The external memory 1234 may be operatively and/or physically connected to the electronic device 1201 through various interfaces.

A security module 1236, which is a module including a storage space that is higher in security level than the memory 1230, may be a circuit for securing safe data storage and protected execution circumstances. The security module 1236 may be implemented with an additional circuit and may include an additional processor. The security module 1236 may be present in an attachable smart chip or SD card, or may include an embedded secure element (eSE), which is installed in a fixed chip. Additionally, the security module 1236 may be driven in another OS which is different from the OS of the electronic device 1201. For example, the security module 1236 may operate based on a java card open platform (JCOP) OS.

The sensor module 1240 may, for example, measure physical quantity or detect an operation state of the electronic device 1201 so as to convert measured or detected information into an electrical signal. The sensor module 1240 may include, for example, at least one of a gesture sensor 1240A, a gyro sensor 1240B, a barometric pressure sensor 1240C, a magnetic sensor 1240D, an acceleration sensor 1240E, a grip sensor 1240F, a proximity sensor 1240G, a color sensor 1240H (e.g., a red/green/blue (RGB) sensor), a biometric sensor 1240I, a temperature/humidity sensor 1240J, an illumination sensor 1240K, or an ultraviolet (UV) sensor 1240M. Additionally or alternatively, the sensor module 1240 may include, for example, an olfactory sensor (E-nose sensor), an electromyography (EMG) sensor, an electroencephalogram (EEG) sensor, an electrocardiogram (ECG) sensor, an infrared (IR) sensor, an iris recognition sensor, and/or a fingerprint sensor. The sensor module 1240 may further include a control circuit for controlling at least one sensor included therein. In some various embodiments of the present disclosure, the electronic device 1201 may further include a processor configured to control the sensor module 1240 as a part of the processor 1210 or separately, so that the sensor module 1240 is controlled while the processor 1210 is in a sleep state.

The input device 1250 may include, for example, a touch panel 1252, a digital stylus or (digital) pen sensor 1254, a key 1256, or an ultrasonic input device 1258. The touch panel 1252 may employ at least one of capacitive, resistive, infrared, and ultraviolet sensing methods. The touch panel 1252 may further include a control circuit. The touch panel 1252 may further include a tactile layer so as to provide a haptic feedback to a user.

The (digital) pen sensor 1254 may include, for example, a sheet for recognition which is a part of a touch panel or is separate. The key 1256 may include, for example, a physical button, an optical button, or a keypad. The ultrasonic input device 1258 may sense ultrasonic waves generated by an input tool through a microphone 1288 so as to identify data corresponding to the ultrasonic waves sensed.

The display 1260 (e.g., the display 1160) may include a panel 1262, a hologram device 1264, or a projector 1266. The panel 1262 may have a configuration that is the same as or similar to that of the display 1160 of FIG. 11. The panel 1262 may be, for example, flexible, transparent, or wearable. The panel 1262 and the touch panel 1252 may be integrated into a single module. The hologram device 1264 may display a stereoscopic image in a space using a light interference phenomenon. The projector 1266 may project light onto a screen so as to display an image. The screen may be disposed in the inside or the outside of the electronic device 1201. According to an embodiment of the present disclosure, the display 1260 may further include a control circuit for controlling the panel 1262, the hologram device 1264, or the projector 1266.

The interface 1270 may include, for example, an HDMI 1272, a USB 1274, an optical interface 1276, or a D-sub-miniature (D-sub) 1278. The interface 1270, for example, may be included in the communication interface 1170 illustrated in FIG. 11. Additionally or alternatively, the interface 1270 may include, for example, a mobile high-definition link (MHL) interface, an SD card/multi-media card (MMC) interface, or an infrared data association (IrDA) interface.

The audio module 1280 may convert, for example, a sound into an electrical signal or vice versa. At least a portion of elements of the audio module 1280 may be included in the input/output interface 1150 illustrated in FIG. 11. The audio module 1280 may process sound information input or output through a speaker 1282, a receiver 1284, an earphone 1286, or the microphone 1288.

The camera module 1291 is, for example, a device for shooting a still image or a video. According to an embodiment of the present disclosure, the camera module 1291 may include at least one image sensor (e.g., a front sensor or a rear sensor), a lens, an image signal processor (ISP), or a flash (e.g., an LED or a xenon lamp).

The power management module 1295 may manage power of the electronic device 1201. According to an embodiment of the present disclosure, the power management module 1295 may include a power management integrated circuit (PMIC), a charger integrated circuit (IC), or a battery or gauge. The PMIC may employ a wired and/or wireless charging method. The wireless charging method may include, for example, a magnetic resonance method, a magnetic induction method, an electromagnetic method, or the like. An additional circuit for wireless charging, such as a coil loop, a resonant circuit, a rectifier, or the like, may be further included. The battery gauge may measure, for example, a remaining capacity of the battery 1296 and a voltage, current or temperature thereof while the battery is charged. The battery 1296 may include, for example, a rechargeable battery and/or a solar battery.

The indicator 1297 may display a specific state of the electronic device 1201 or a part thereof (e.g., the processor 1210), such as a booting state, a message state, a charging state, or the like. The motor 1298 may convert an electrical signal into a mechanical vibration, and may generate a vibration or haptic effect. Although not illustrated, a processing device (e.g., a GPU) for supporting a mobile TV may be included in the electronic device 1201. The processing device for supporting a mobile TV may process media data according to the standards of digital multimedia broadcasting (DMB), digital video broadcasting (DVB), Media-FLO™, or the like.

Each of the elements described herein may be configured with one or more components, and the names of the elements may be changed according to the type of an electronic device. In various embodiments of the present disclosure, an electronic device may include at least one of the elements described herein, and some elements may be omitted or other additional elements may be added. Furthermore, some of the elements of the electronic device may be combined with each other so as to form one entity, so that the functions of the elements may be performed in the same manner as before the combination.

Figure 13:
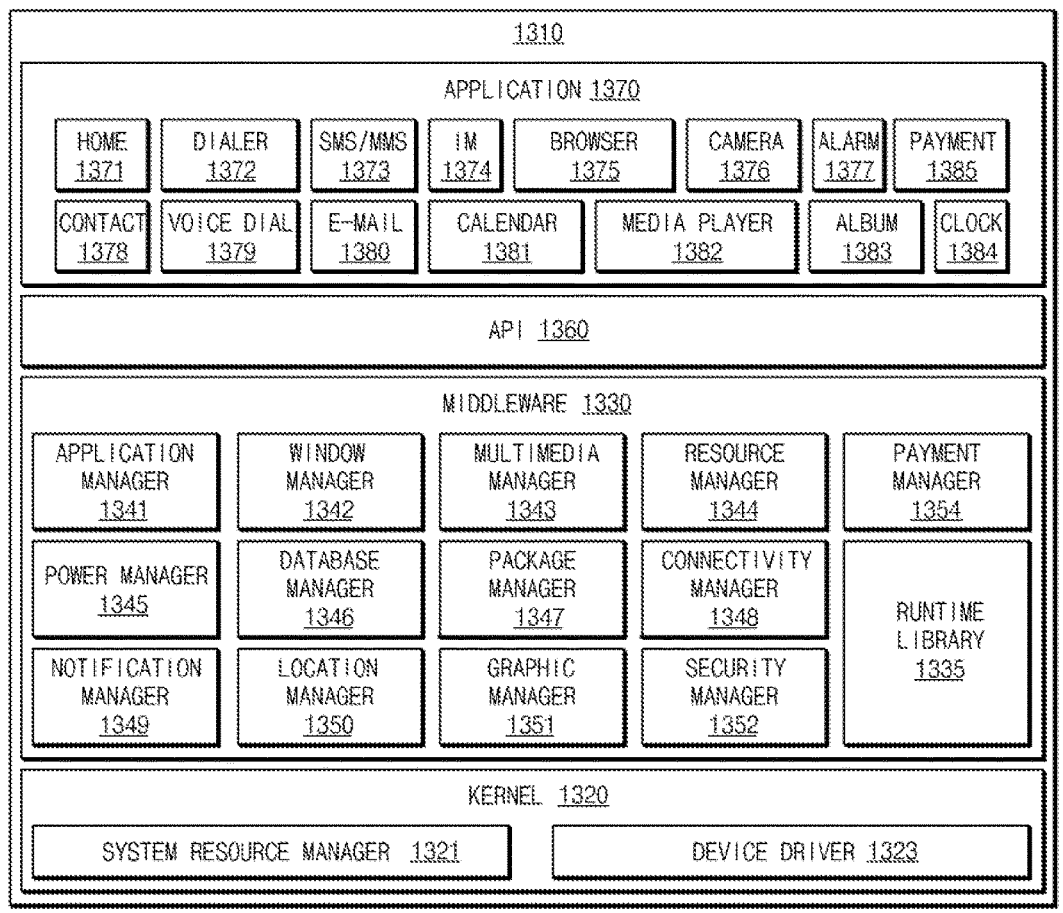
FIG. 13 illustrates a block diagram of a program module according to various embodiments of the present disclosure.

FIG. 13 illustrates a block diagram of a program module according to various embodiments of the present disclosure.

Referring to FIG. 13, a program module 1310 (e.g., the program 1140) may include an operating system (OS) for controlling a resource related to an electronic device (e.g., the electronic device 1101) and/or various applications (e.g., the application program 1147) running on the OS. The OS may be, for example, Android™, iOS™, Windows™, Symbian®, Tizen®, or the like.

The program module 1310 may include a kernel 1320, a middleware 1330, an API 1360, and/or an application 1370. At least a part of the program module 1310 may be preloaded on an electronic device or may be downloaded from an external electronic device (e.g., the first electronic device 1102, the second external electronic device 1104, or the server 1106).

The kernel 1320 (e.g., the kernel 1141) may include, for example, a system resource manager 1321 or a device driver 1323. The system resource manager 1321 may perform control, allocation, or retrieval of a system resource. According to an embodiment of the present disclosure, the system resource manager 1321 may include a process management unit, a memory management unit, a file system management unit, or the like. The device driver 1323 may include, for example, a display driver, a camera driver, a Bluetooth driver, a shared memory driver, a USB driver, a keypad driver, a Wi-Fi driver, an audio driver, or an inter-process communication (IPC) driver.

The middleware 1330, for example, may provide a function that the applications 1370 require in common, or may provide various functions to the applications 1370 through the API 1360 so that the applications 1370 may efficiently use limited system resources in the electronic device. According to an embodiment of the present disclosure, the middleware 1330 (e.g., the middleware 1143) may include at least one of a runtime library 1335, an application manager 1341, a window manager 1342, a multimedia manager 1343, a resource manager 1344, a power manager 1345, a database manager 1346, a package manager 1347, a connectivity manager 1348, a notification manager 1349, a location manager 1350, a graphic manager 1351, a security manager 1352, and a payment manager 1354.

The runtime library 1335 may include, for example, a library module that a complier uses to add a new function through a programming language while the application 1370 is running. The runtime library 1335 may perform a function for input/output management, memory management, or an arithmetic function.

The application manager 1341 may mange, for example, a life cycle of at least one of the applications 1370. The window manager 1342 may manage a GUI resource used in a screen. The multimedia manager 1343 may recognize a format required for playing various media files and may encode or decode a media file using a codec matched to the format. The resource manager 1344 may manage a resource such as a source code, a memory, or a storage space of at least one of the applications 1370.

The power manager 1345, for example, may operate together with a basic input/output system (BIOS) to manage a battery or power and may provide power information required for operating the electronic device. The database manager 1346 may generate, search, or modify a database to be used in at least one of the applications 1370. The package manager 1347 may manage installation or update of an application distributed in a package file format.

The connectivity manger 1348 may manage wireless connection of Wi-Fi, BT, or the like. The notification manager 1349 may display or notify an event such as message arrival, appointments, and proximity alerts in such a manner as not to disturb a user. The location manager 1350 may manage location information of the electronic device. The graphic manager 1351 may manage a graphic effect to be provided to a user or a user interface related thereto. The security manager 1352 may provide various security functions required for system security or user authentication. According to an embodiment of the present disclosure, in the case in which an electronic device (e.g., the electronic device 1101) includes a phone function, the middleware 1330 may further include a telephony manager for managing a voice or video call function of the electronic device.

The middleware 1330 may include a middleware module for forming a combination of various functions of the above-mentioned elements. The middleware 1330 may provide a module specialized for each type of an operating system (OS) to provide differentiated functions. Furthermore, the middleware 1330 may delete a part of existing elements or may add new elements dynamically.

The API 1360 (e.g., the API 1145) which is, for example, a set of API programming functions may be provided in a different configurations according to an OS. For example, in the case of Android™ or iOS™, one API set may be provided for each platform, and, in the case of Tizen®, at least two API sets may be provided for each platform.

The application 1370 (e.g., the application program 1147), for example, may include at least one application capable of performing functions such as a home 1371, a dialer 1372, an short message service (SMS)/multimedia messaging service MMS 1373, an instant message (IM) 1374, a browser 1375, a camera 1376, an alarm 1377, a contact 1378, a voice dial 1379, an e-mail 1380, a calendar 1381, a media player 1382, an album 1383, a clock 1384, payment 1385, health care (e.g., measure an exercise amount or blood sugar), or environmental information provision (e.g., provide air pressure, humidity, or temperature information).

According to an embodiment of the present disclosure, the application 1370 may include an information exchange application for supporting information exchange between the electronic device (e.g., the electronic device 1101) and an external electronic device (e.g., the first electronic device 1102 or the second external electronic device 1104). The information exchange application may include, for example, a notification relay application for relaying specific information to the external electronic device or a device management application for managing the external electronic device.

For example, the notification relay application may have a function for relaying, to an external electronic device (e.g., the first electronic device 1102 or the second external electronic device 1104), notification information generated in another application (e.g., an SMS/MMS application, an e-mail application, a health care application, an environmental information application, or the like) of the electronic device. Furthermore, the notification relay application may receive notification information from the external electronic device and may provide the received notification information to the user.

The device management application, for example, may manage (e.g., install, delete, or update) at least one function (e.g., turn-on/turn off of the external electronic device itself (or some elements) or the brightness (or resolution) adjustment of a display) of the external electronic device (e.g., the first electronic device 1102 or the second external electronic device 1104) communicating with the electronic device, an application running in the external electronic device, or a service (e.g., a call service, a message service, or the like) provided from the external electronic device.

According to an embodiment of the present disclosure, the application 1370 may include a specified application (e.g., a healthcare application of a mobile medical device) according to an attribute of the external electronic device (e.g., the first electronic device 1102 or the second external electronic device 1104). The application 1370 may include an application received from an external electronic device (e.g., the first electronic device 1102 or the second external electronic device 1104). The application 1370 may include a preloaded application or a third-party application downloadable from a server. The names of the elements of the program module 1310 illustrated may vary with the type of an operating system (OS).

According to various embodiments of the present disclosure, at least a part of the program module 1310 may be implemented with software, firmware, hardware, or a combination thereof. At least a part of the program module 1310, for example, may be implemented (e.g., executed) by a processor (e.g., the processor 1210). At least a part of the program module 1310 may include, for example, a module, a program, a routine, sets of instructions, or a process for performing at least one function.

The term "module" used herein may represent, for example, a unit including one of hardware, software and firmware or a combination thereof. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific integrated circuit (ASIC) chip, a field-programmable gate array (FPGA), and a programmable-logic device for performing some operations, which are known or will be developed.

At least a part of devices (e.g., modules or functions thereof) or methods (e.g., operations) according to various embodiments of the present disclosure may be implemented as instructions stored in a computer-readable storage medium in the form of a program module. In the case where the instructions are performed by a processor (e.g., the processor 1120), the processor may perform functions corresponding to the instructions. The computer-readable storage medium may be, for example, the memory 1130.

A computer-readable recording medium may include a hard disk, a floppy disk, a magnetic medium (e.g., a magnetic tape), an optical medium (e.g., compact disc-ROM (CD-ROM), digital versatile disc (DVD)), a magneto-optical medium (e.g., a floptical disk), or a hardware device (e.g., a ROM, a RAM, a flash memory, or the like). The program instructions may include machine language codes generated by compilers and high-level language codes that can be executed by computers using interpreters. The above-mentioned hardware device may be configured to be operated as one or more software modules for performing operations of various embodiments of the present disclosure and vice versa.

For example, an electronic device may include a processor and a memory for storing computer-readable instructions. The memory may include instructions for performing the above-mentioned various methods or functions when executed by the processor.

A module or a program module according to various embodiments of the present disclosure may include at least one of the above-mentioned elements, or some elements may be omitted or other additional elements may be added. Operations performed by the module, the program module or other elements according to various embodiments of the present disclosure may be performed in a sequential, parallel, iterative or heuristic way. Furthermore, some operations may be performed in another order or may be omitted, or other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
    a communication circuit configured to communicate with an external electronic device; and
    at least one processor electrically connected with the communication circuit,
    wherein the at least one processor is configured to:
        obtain context information about a current operation being performed at the electronic device;
        identify a recommended operation associated with the current operation, based on the context information about the current operation, wherein the recommended operation includes another operation associated with the current operation; and
        send identification information about the recommended operation to the external electronic device by using the communication circuit when a handoff of the recommended operation is provided to the external electronic device.

2. The electronic device of claim 1, wherein the identification information about the recommended operation is an indication that allows the external electronic device to identify the recommended operation.

3. The electronic device of claim 1, wherein the at least one processor is further configured to obtain the context information about the current operation, the context information comprising information about at least one of a type of an application associated with the current operation, a type of a web site associated with the current operation, an accessory operatively connected with the electronic device, a place, or a time.

4. The electronic device of claim 3,
    wherein the context information comprises information about a type of the application associated with the current operation and an accessory associated with the current operation that is operatively connected with the electronic device, and
    wherein the at least one processor is further configured to:
        generate handoff information comprising information about the application associated with the current operation and the accessory associated with the current operation, and
        provide the external electronic device with the handoff information when a handoff request is received from the external electronic device.

5. The electronic device of claim 1, wherein the at least one processor is further configured to obtain at least a portion of the context information about the current operation from a server through the communication circuit.

6. The electronic device of claim 1, wherein the at least one processor is further configured to identify the recommended operation based on the context information about the current operation, the identification information comprising at least a part of the current operation.

7. The electronic device of claim 1, wherein the at least one processor is further configured to:
store the context information about the current operation in a database,
classify pieces of the context information stored in the database into a plurality of segments based on a similarity between the pieces of context information, and
obtain the recommended operation from one of the plurality of segments based on the context information about the current operation.

8. The electronic device of claim 1, wherein the at least one processor is further configured to:
provide the external electronic device with identification information about a preliminary recommended operation, which is generated based on a portion of the context information about the current operation, and
provide the external electronic device with the identification information about the recommended operation, which is identified based on all the context information about the current operation if a handoff request is received from the external electronic device.

9. The electronic device of claim 8, wherein the at least one processor is configured to:
connect, through the communication circuit, the electronic device with the external electronic device, when the handoff request is received from the external electronic device, and
provide the external electronic device with the identification information about the recommended operation when the electronic device is connected with the external electronic device.

10. The electronic device of claim 8, wherein the at least one processor is further configured to provide the external electronic device with identification information about an accessory associated with the current operation.

11. The electronic device of claim 8, wherein the at least one processor is further configured to provide content associated with the recommended operation together with the identification information about the recommended operation, when the handoff request is received from the external electronic device.

12. A handoff function provision method of an electronic device, the method comprising:
obtaining, by the electronic device, context information about a current operation at the electronic device;
identify, by the electronic device, a recommended operation associated with the current operation, based on the context information about the current operation, wherein the recommended operation includes another operation associated with the current operation; and
sending, by the electronic device, identification information about the recommended operation to an external electronic device when a handoff of the recommended operation is provided to the external electronic device.

13. The method of claim 12, wherein the obtaining comprises:
obtaining the context information about the current operation, the context information comprising information about at least one of a type of an application associated with the current operation, a type of a web site associated with the current operation, an accessory operatively connected with the electronic device, a place, or a time.

14. The electronic device of claim 13,
wherein the context information comprises information about a type of the application associated with the current operation and an accessory associated with the current operation that is operatively connected with the electronic device, and
wherein the method further comprises:
generating handoff information comprising information about the application associated with the current operation and the accessory associated with the current operation, and
providing the external electronic device with the handoff information when a handoff request is received from the external electronic device.

15. The method of claim 12, wherein the obtaining comprises:
obtaining at least a portion of the context information about the current operation from a server.

16. The method of claim 12, wherein the identifying of the recommended operation comprises:
identifying the recommended operation based on the context information about the current operation, and
wherein the identification information about the recommended operation comprises at least a part of the current operation.

17. The method of claim 12, further comprising:
storing the context information about the current operation in a database;
classifying pieces of the context information stored in the database into a plurality of segments based on a similarity between the pieces of context information; and
obtaining the recommended operation from one of the plurality of segments based on the context information about the current operation.

18. The method of claim 12, wherein the sending comprises:
providing the external electronic device with identification information about a preliminary recommended operation, which is generated based on a portion of the context information about the current operation; and
providing the external electronic device with the identification information about the recommended operation, which is generated based on all the context information about the current operation if a handoff request is received from the external electronic device.

19. The method of claim 18, wherein the sending comprises:
connecting the electronic device with the external electronic device by using a communication circuit of the electronic device, when the handoff request is received from the external electronic device; and
providing the external electronic device with the identification information about the recommended operation when the electronic device is connected with the external electronic device.

20. A non-transitory computer-readable medium configured to store one or more computer programs including instruction that, when executed by at least one processor of an electronic device, cause the at least one processor to control for:
obtaining context information about a current operation at the electronic device;
identify a recommended operation associated with the current operation, based on the context information about the current operation, wherein the recommended operation includes another operation associated with the current operation; and sending identification information about the recommended operation to an external electronic device when a handoff of the recommended operation is provided to the external electronic device.

* * * * *